United States Patent
Trygstad

(10) Patent No.: US 10,900,327 B2
(45) Date of Patent: *Jan. 26, 2021

(54) SYSTEM AND METHOD FOR HYDROTHERMAL UPGRADING OF FATTY ACID FEEDSTOCK

(71) Applicant: Aduro Energy, Inc., North York (CA)

(72) Inventor: W. Marcus Trygstad, Spring, TX (US)

(73) Assignee: Aduro Energy, Inc., North York (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/818,274

(22) Filed: Nov. 20, 2017

(65) Prior Publication Data

US 2018/0073331 A1 Mar. 15, 2018

Related U.S. Application Data

(63) Continuation-in-part of application No. 15/587,573, filed on May 5, 2017, which is a continuation of
(Continued)

(51) Int. Cl.
| | |
|---|---|
| *B01J 19/24* | (2006.01) |
| *E21B 41/00* | (2006.01) |

(Continued)

(52) U.S. Cl.
CPC ........... *E21B 41/00* (2013.01); *B01J 19/0013* (2013.01); *B01J 19/0026* (2013.01);
(Continued)

(58) Field of Classification Search
CPC .. B01J 19/242; B01J 19/2415; B01J 19/0013; B01J 19/0026; C10G 1/002; C10G 1/04;
(Continued)

(56) References Cited

U.S. PATENT DOCUMENTS

| | | |
|---|---|---|
| 1,956,567 A | 5/1934 | Carleton |
| 3,607,130 A | 9/1971 | Worley |

(Continued)

FOREIGN PATENT DOCUMENTS

| | | |
|---|---|---|
| CA | 277 4062 | 4/2011 |
| CA | 2774062 A1 | 4/2011 |

(Continued)

OTHER PUBLICATIONS

Translation of Foreign Office Action Colombian Patent Office in related application Colombian national phase of PCT/US2015/021258, provided by Catillo, Grau & Associates (Bogota, D.C.), in letter to Applicant's attorney dated Aug. 14, 2018.

(Continued)

*Primary Examiner* — Lessanework Seifu
(74) *Attorney, Agent, or Firm* — Davis Malm & D'Agostine, P.C.; Richard L. Sampson

(57) ABSTRACT

A system and method is provided for upgrading a continuously flowing process stream including heavy crude oil (HCO). A reactor receives the process stream in combination with water, at an inlet temperature within a range of about 60° C. to about 200° C. The reactor includes one or more process flow tubes having a combined length of about 30 times their aggregated transverse cross-sectional dimension, and progressively heats the process stream to an outlet temperature T(max)1 within a range of between about 260° C. to about 400° C. The reactor maintains the process stream at a pressure sufficient to ensure that it remains a single phase at T(max)1. A controller selectively adjusts the rate of flow of the process stream through the reactor to maintain a total residence time of greater than about 1 minute and less than about 25 minutes.

60 Claims, 16 Drawing Sheets

Related U.S. Application Data application No. 14/218,619, filed on Mar. 18, 2014, now Pat. No. 9,644,455, which is a continuation-in-part of application No. 14/064,317, filed on Oct. 28, 2013, now Pat. No. 9,783,742.

(60) Provisional application No. 62/424,815, filed on Nov. 21, 2016, provisional application No. 61/770,638, filed on Feb. 28, 2013.

(51) Int. Cl.

| | | |
|---|---|---|
| *C10G 9/36* | (2006.01) | |
| *C10G 1/04* | (2006.01) | |
| *C10G 55/04* | (2006.01) | |
| *B01J 19/00* | (2006.01) | |
| *C10G 31/08* | (2006.01) | |
| *C10G 75/00* | (2006.01) | |

(52) U.S. Cl.
CPC ......... *B01J 19/242* (2013.01); *B01J 19/2415* (2013.01); *C10G 1/04* (2013.01); *C10G 1/047* (2013.01); *C10G 9/36* (2013.01); *C10G 31/08* (2013.01); *C10G 55/04* (2013.01); *C10G 75/00* (2013.01); *B01J 2219/0006* (2013.01); *B01J 2219/0011* (2013.01); *B01J 2219/00058* (2013.01); *B01J 2219/00063* (2013.01); *B01J 2219/00094* (2013.01); *B01J 2219/00164* (2013.01); *B01J 2219/00166* (2013.01); *C10G 2300/1033* (2013.01); *C10G 2300/206* (2013.01); *Y02P 30/00* (2015.11)

(58) Field of Classification Search
CPC .......... C10G 1/047; C10G 9/36; C10G 55/04; E21B 41/00
See application file for complete search history.

(56) References Cited

U.S. PATENT DOCUMENTS

| | | | |
|---|---|---|---|
| 4,265,731 A | 5/1981 | Mitchell | |
| 4,719,002 A | 1/1988 | Maver | |
| 4,778,586 A | 10/1988 | Bain | |
| 4,840,725 A | 6/1989 | Paspek | |
| 6,048,448 A | 4/2000 | Nirell | |
| 6,230,814 B1 * | 5/2001 | Nasr | C09K 8/592 |
| | | | 166/263 |
| 7,947,165 B2 | 5/2011 | Berkowitz et al. | |
| 8,105,480 B2 | 1/2012 | Chronet et al. | |
| 9,644,455 B2 | 5/2017 | Trygstad | |
| 2005/0150817 A1 | 7/2005 | Tallman et al. | |
| 2008/0099378 A1 | 5/2008 | He et al. | |
| 2008/0274017 A1 | 11/2008 | Boykin et al. | |
| 2009/0090658 A1 * | 4/2009 | Burkus | C10G 1/047 |
| | | | 208/390 |
| 2009/0159498 A1 | 6/2009 | Chinn et al. | |
| 2010/0236783 A1 | 9/2010 | Nenniger et al. | |
| 2010/0276147 A9 | 11/2010 | Hocking | |
| 2013/0105362 A1 | 5/2013 | Salazar et al. | |

FOREIGN PATENT DOCUMENTS

| | | |
|---|---|---|
| WO | WO 2009 085461 A1 | 7/2009 |
| WO | WO2012000115 A1 | 1/2012 |
| WO | WO 2014 167424 A2 | 10/2014 |
| WO | WO 2014 167424 A2 | 10/2016 |

OTHER PUBLICATIONS

SuppEP Search Rpt, EP, dated Oct. 16, 2017, Aduro Energy, Inc.
Supplemental EP Search Report for EP 15765080 dated Oct. 25, 2017; Applicant: Aduro Energy, Inc. et. al.; pp. 1-7.

\* cited by examiner

SYSTEM AND METHOD FOR HYDROTHERMAL UPGRADING OF FATTY ACID FEEDSTOCK

RELATED APPLICATION

This application claims the benefit of U.S. Provisional Patent Application Ser. No. 62/424,815, entitled System and Method for Controlling and Optimizing the Hydrothermal Upgrading of Heavy Crude Oil and Bitumen, filed on Nov. 21, 2016, and is a Continuation-In-Part of U.S. patent application Ser. No. 15/587,573, entitled System and Method for Controlling and Optimizing the Hydrothermal Upgrading of Heavy Crude Oil and Bitumen, filed on May 5, 2017, which is a Continuation of U.S. patent application Ser. No. 14/218,619 (now U.S. Pat. No. 9,644,455), entitled System and Method for Controlling and Optimizing the Hydrothermal Upgrading of Heavy Crude Oil and Bitumen, filed on Mar. 18, 2014, which is a Continuation-In-Part of U.S. patent application Ser. No. 14/064,317 (now U.S. Pat. No. 9,783,742), entitled System and Method for Controlling and Optimizing the Hydrothermal Upgrading of Heavy Crude Oil and Bitumen, filed on Oct. 28, 2013, and which claims the benefit of U.S. Provisional Patent Application Ser. No. 61/770,638, entitled System and Method for Controlling and Optimizing the Hydrothermal Upgrading of Heavy Crude Oil and Bitumen, filed on Feb. 28, 2013, the contents all of which are incorporated herein by reference in their entireties for all purposes.

BACKGROUND

Technical Field

This invention relates to hydrocarbon processing, and more particularly to systems and methods for efficiently upgrading heavy crude oil.

Background Information

Introduction to Heavy Crude Oil

The average weight or density of crude oils extracted from oil fields globally has been increasing very gradually over time, a trend expected to continue indefinitely. However, the existence of large reserves of heavy and extra-heavy crude oils in some countries means that the as-produced weight of crude oil can increase much more rapidly on a regional basis. Of particular importance are the tar oils in the Orinoco Belt in Venezuela and oil sand bitumen in Alberta, Canada, which in aggregate are currently estimated as being 2-3 times the size of the oil reserves in Saudi Arabia. The density of Saudi Arabian crude oils, expressed as API gravity or ° API, may typically fall in the range of about 27-34° API, in the center of which falls the current global average. By contrast, the deposits in Venezuela and Alberta are generally characterized as being heavy crude oils (HCO) or extra-heavy crude oils (EHCO) for which the corresponding densities may be regarded generally as being below about 22.3° API and about 10° API, respectively. (The lower the ° API value, the higher the density.) For deposits that are heavier still, such as in the case of some natural bitumen deposits in Alberta, the term ultra-heavy crude oil (UHCO) is sometimes applied. In most cases, the densities of native, unmodified heavy crude oils produced in Venezuela and Alberta are below about 15° API, and even below 10° API. (Though the classification scheme used herein to differentiate crude oils in terms of ° API will be recognized by those skilled in the art, other conventions and criteria exist, which may apply different terms and ° API ranges and/or include other criteria such as viscosity and percent sulfur. Therefore, definitions used herein should not be regarded as limiting but only illustrative.)

From the viewpoint of crude oil production and transport, HCO, EHCO, and UHCO, the entire group of which shall hereinafter be referred to inclusively as heavy crude oils (HCO) without limitation as regards exact composition or geological or geographic origin, are problematic because the same physico-chemical characteristics that cause their elevated density produce a corresponding increase in viscosity. By way of illustration that is neither bound by theory nor intended to be complete or applicable to all crude oils, asphaltenes are a class of diverse compounds known to affect density and viscosity directly and to have concentrations in HCO that are generally higher than in medium and light crudes. Having molecular weights that are high relative to other compounds in crude oils generally, increasing asphaltene concentration is generally accompanied by an increase in both density and viscosity. This may be due to the tendency of asphaltenes to self-associate, or it may be due to the formation of dense microscopic particles comprising a dense core of aggregated asphaltenes surrounded by layers of other crude oil components. Regardless of the mechanisms by which composition and microscopic structure cause elevated density and viscosity, HCO is generally not amenable to the methods of transportation and storage commonly applied to medium crude oils (about 22.3° API to about 31.1° API) and light crude oils (greater than about 31.1° API). For example, if crude oil were required to have a minimum ° API value of about 20 to be pipelineable, and if transport by rail tank car is precluded on the grounds of practical economics and logistics, then delivery to market of crude oil extracted from Albertan oil sands requires that it be somehow upgraded to meet pipeline specifications for density and viscosity.

Approaches to Upgrading Heavy Crude Oils

Commercially relevant upgrading strategies currently applied in Alberta fall into two general categories. In the first, coking, hydrocracking, or other techniques are applied to HCO to chemically convert asphaltenes and other heavy components into lighter materials, which are recovered through distillation and blended to produce pipeline quality synthetic crude oil. The various conversion and recovery processes are related to those employed in oil refining and the overall approach is correspondingly capital intensive, adding an estimated $14 per barrel. Furthermore, economic considerations preclude an implementation strategy whereby smaller-scale upgrading facilities may be located in or near numerous production fields.

Producers therefore rely on another, simpler strategy whereby the bitumen and heavy oil are mixed with higher-value, lighter petroleum products at the wellhead to produce diluted bitumen (dilbit) that can be easily transported through pipelines. However, several significant issues are associated with dilbit. First, the diluent must be transported by rail or pipeline to production fields from distant refineries or gas processing plants where it is produced. Second, dilbit in pipelines may typically contain about 20% to 40% diluent, effectively reducing the net capacity of pipelines to carry unrefined crude. Compounding these issues, the net cost for diluent in terms of both the material itself and the facilities required to handle it adds $10-$16 per barrel of dilbit. However, beyond infrastructure and cost considerations looms a broader problem, namely, that diluent-based upgrading may not be a practical way to meet future growth of Canadian HCO production. Absent an alternative approach, Canada will be required to import ever increasing quantities of diluents. Currently, efforts are underway to expand the pipeline infrastructure from the Gulf Coast of the United Stated all the way to Alberta via Illinois to carry the "pentane plus" condensate by-product of shale gas production.

The need exists in the art for a new approach that requires lower initial capital investment, has lower ongoing operating costs, and combines the best features of the two main upgrading methods used currently: reduction of the density and viscosity of the native crude through conversion of asphaltenes and other heavy components into lighter ones; and scalability that permits distributed implementation at or near the wellhead to minimize or eliminate the reliance on diluent from remote sources.

SUMMARY

According to one aspect of the present invention, a system is provided for upgrading a continuously flowing process stream including heavy crude oil (HCO). The system includes a fluid flow path configured to convey the process stream continuously therethrough in a downstream direction. The flow path includes a reactor configured to receive the process stream in combination with water, at an inlet temperature within a range of about 60° C. to about 200° C. The reactor includes one or more process flow tubes defining an aggregated interior cross-sectional dimension transverse to the downstream direction, the flow tubes having a combined length of at least about 30 times the aggregated interior cross-sectional dimension. The reactor applies heat to progressively heat the process stream to an outlet temperature T(max)1 within a range of between about 260° C. to about 400° C. The reactor is also configured to maintain the process stream at a pressure sufficient to ensure that it remains a single phase at T(max)1. A controller is configured to selectively adjust the rate of flow of the process stream through the reactor to maintain a total residence time in the reactor of greater than about 1 minute and less than about 25 minutes. This rate of flow, in combination with the flow tube length and cross-sectional area, and the progressive application of heat, are configured to minimize or prevent coke formation.

In another aspect of the invention, a method for upgrading a continuously flowing process stream including heavy crude oil (HCO) includes supplying the process stream to the aforementioned system.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

Figure 1:
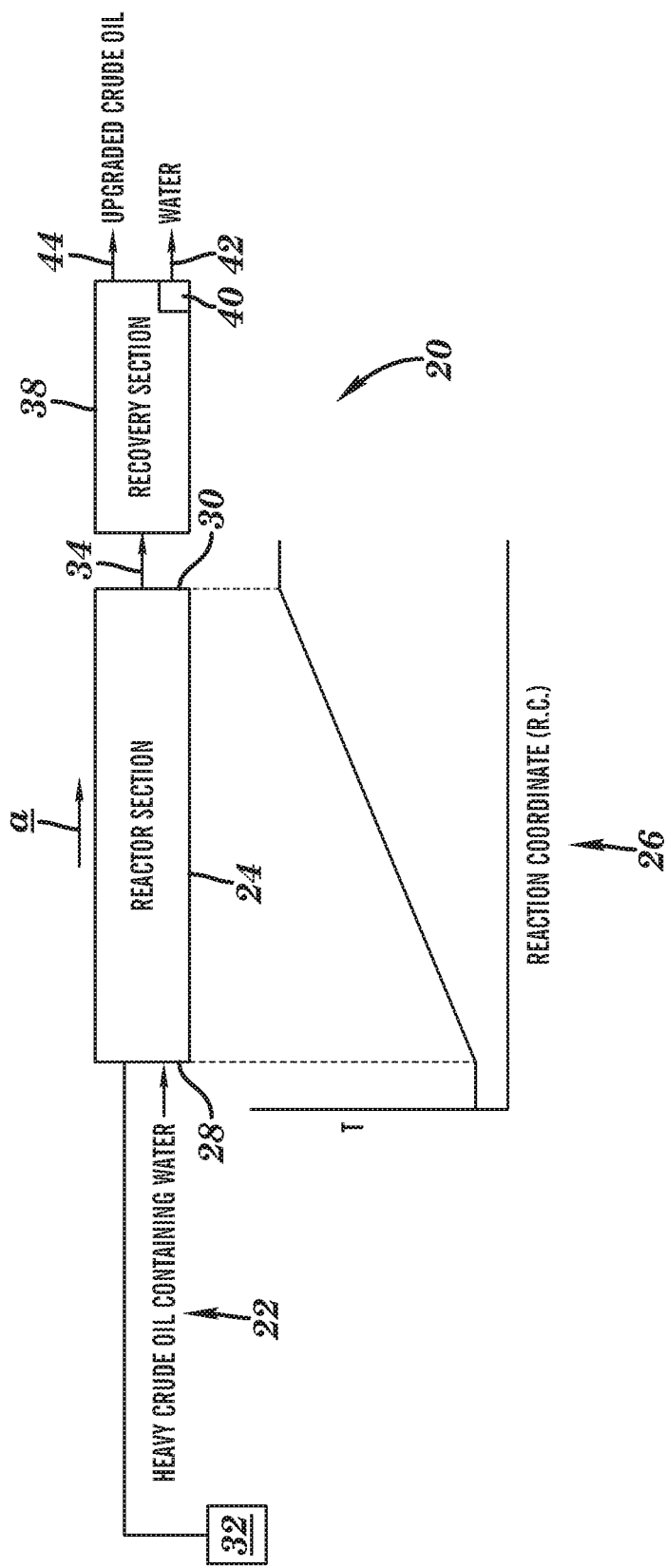
FIG. 1 is a schematic diagram of a representative embodiment of a hydrothermal heavy crude oil (HCO) upgrading system of the present invention.

As will now be described in detail, embodiments of the present invention relate to upgrading a continuously flowing stream including heavy crude oils, extra-heavy crude oils, ultra-heavy crude oils, bitumen, and the like without limitation in regard to exact composition or geologic or geographic origin, which hereinafter are referred to inclusively as heavy crude oils or simply HCO. Indeed, as used herein, the term "heavy crude oil" and/or "HCO" refers to substantially any crude oil or hydrocarbon-containing material measuring at or below about 22.3° API, with lower ° API values corresponding to higher densities. Referring to FIG. 1, in one example, a system 20 is provided for the hydrothermal upgrading of a process stream (reaction mixture) 22 (HCO and water) by a reactor portion (section) 24 configured to progressively heat the process stream 22 as a function of the reaction coordinate (R.C.) 26. The R.C. 26 may be calculated as (a) the relative distance between an inlet 28 and outlet 30 traversed by the process stream 22 within the reactor section 24, or (b) the time elapsed after the reaction mixture 22 enters the reactor section at 28, times flow rate divided by the total volume of the fluid flow path within the reactor section 24. In FIG. 1, the rate of heat applied (rate of heat transfer or thermal flux) to the reaction mixture 22 is shown graphically as temperature (T) of the process mixture 22 (on the y-axis), as a function of the R.C. 26 (on the x-axis.) Moreover, in particular embodiments, the thermal flux or temperature applied at the reactor 24 is increased progressively along the downstream direction a. This progressively increasing thermal flux may be provided, for example, by an otherwise conventional counter-flow heat exchanger such as the shell-and-tube heat exchanger shown and described hereinbelow with respect to FIGS. 7, 8 and 11. It should be recognized, however, that substantially any type of heater known to those skilled in the art, e.g., arranged in series with one another along the process fluid flow path may be used, without departing from the scope of the present invention.

Figure 11:
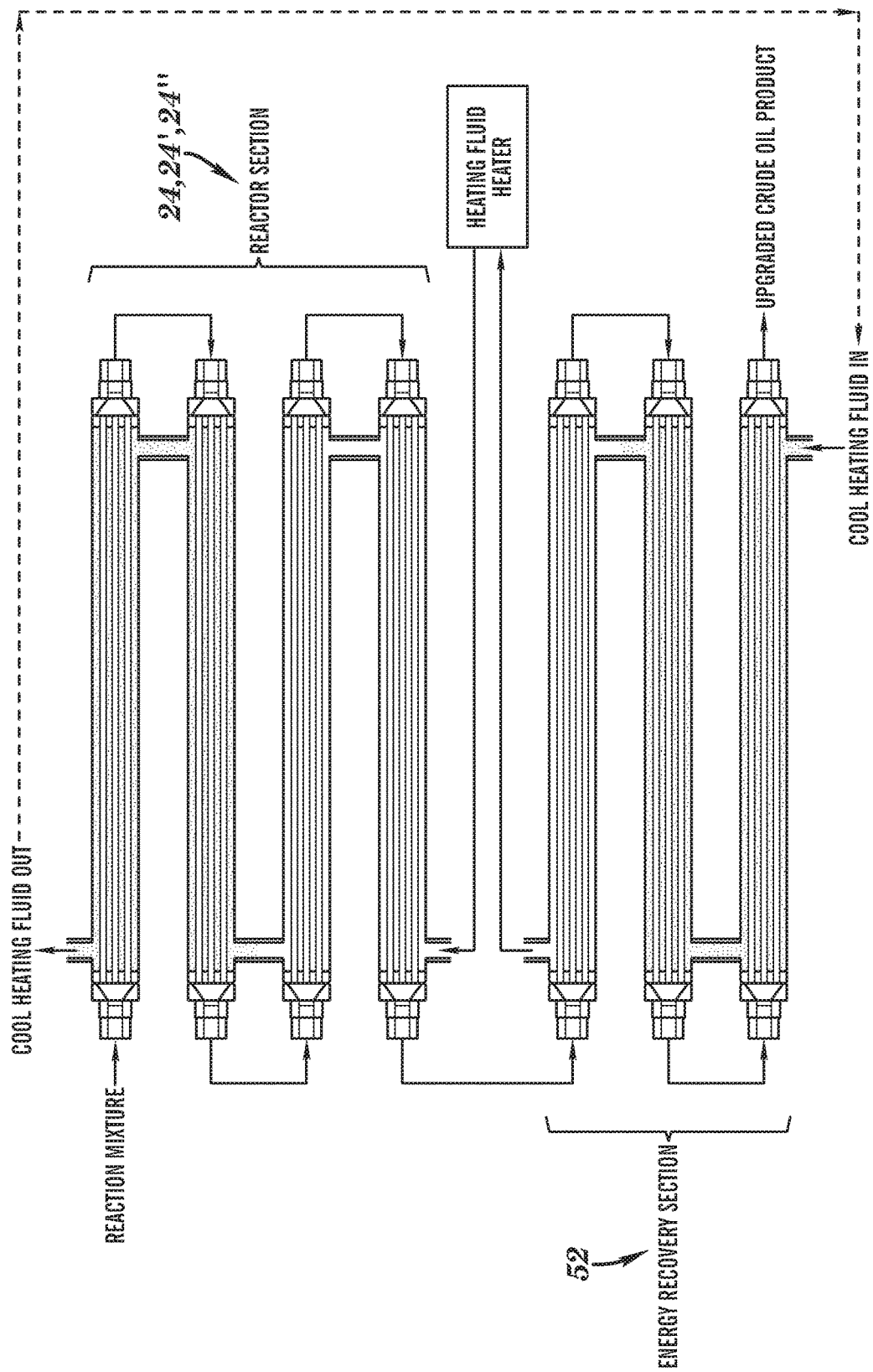
FIG. 11 is a schematic diagram of still other reactor portions usable with embodiments of the present invention.

In particular embodiments, the reactor section 24 includes one or more process flow tubes each having an interior cross-sectional dimension (e.g., diameter) in a plane extending transversely to the downstream direction a therethrough. In this regard, it should be recognized that the process flow tubes may be disposed in series, such as shown and described hereinbelow with respect to FIG. 7, and/or in parallel, as shown in FIG. 11. Regardless of whether the flow tubes are disposed in series, in parallel, or in a combination thereof, the flow tubes are provided with a combined length of at least about 30 times the aggregated interior cross-sectional dimension. For purposes of computing the aggregated interior cross-sectional dimension, flow tubes disposed in series are treated as a single tube. Therefore, for example, a reactor having one or more flow tubes in series, each with a diameter of 5 cm would have an aggregated cross-sectional dimension of 5 cm and a total length of at least 30×5 cm or about 150 cm. Similarly, a reactor having three parallel flow tubes each having a diameter of 5 cm, would have an aggregated cross-sectional dimension of 15 cm and a length of at least about 450 cm. Moreover, although these examples contemplate flow tubes of circular cross-section, one skilled in the art will recognize that tubes of substantially any shape cross-section, such as square, oblong, etc., may be used without departing from the scope of the present invention.

The reactor 24 is configured to apply heat to the reaction mixture flowing therethrough, to progressively heat the reaction mixture 22 so that the reaction mixture is disposed at a lower temperature at an upstream or inlet portion of the reactor, e.g., at 28, than at a downstream or outlet portion of the reactor, e.g., at 30. In particular examples, the reactor 24 is configured to progressively heat the reaction mixture 22 from an inlet 28 temperature of about 60° C. to 200° C., to an outlet 30 temperature (T(max)1) of between about 260° C. and 400° C. It should be noted that this progressive heating may be accomplished either substantially continuously, as shown in FIGS. 1-7, or discontinuously, as will be discussed in greater detail hereinbelow with respect to FIGS. 8-10. It is also noted that the reactor 24 is configured to maintain the reaction mixture 22 at a pressure sufficient to ensure that the reaction mixture remains a single phase at T(max)1, i.e., to substantially prevent formation of a gas phase separate from the liquid phase of the reaction mixture 22. In various exemplary embodiments, pressure within reactor 24 may be maintained within a range of about 1500 to about 3000 psia, with particular embodiments being maintained within a range of 1500 to 2000 psia, and other embodiments being maintained within a range of about 2000 to 3000 psia.

As also shown, system 20 may also include a controller 32, e.g., in the form of a conventional closed-loop programmable logic controller (PLC) or process automation controller (PAC) such as the model T2750 commercially available from Foxboro (Invensys Systems, Inc., Foxborough, Mass., USA), optionally augmented with model predictive control (MPC) capability, communicably coupled to reactor 24, including a flowmeter and temperature and pressure probes associated therewith (not shown) for capturing the flow rate, temperature and pressure of the process stream 22. The controller 32 is configured to adjust both the rate of flow of reaction mixture 22 into the reactor 24, and/or the rate of heat applied (rate of heat transfer or thermal flux) to the reaction mixture 22 in the reactor 24 (e.g., by controlling operation of hardware commonly associated with process flow, such as pumps, valves, heaters, etc. (not shown)). In particular embodiments, controller 32 is configured to ensure that the flow rate is sufficiently high and the rate of heat transfer is sufficiently low to minimize or substantially prevent coke formation, while maintaining a total residence time of the reaction mixture 22 within the reactor 24 of greater than about 1 minute and less than about 25 minutes, calculated as the total volume of the fluid flow path within the reactor divided by the flow rate, to form a product mixture 34 exiting the reactor at 30. It is noted that both the flow rate and the thermal flux from the inside surface of the tube or tubes in the reactor section may be optimized to minimize or prevent coke formation while achieving the desired level of upgrading and maximizing throughput, while taking into consideration the thermal conductivity of the reaction mixture 22.

As also shown, system 20 includes a recovery portion (section) 38 configured to receive the process stream, which has now been transformed into product mixture 34, exiting the reactor section at 30. Recovery section 38 is configured to reduce the temperature of the product mixture 34, e.g., to between 60° C. and 200° C., and to also effect a corresponding reduction in the vapor pressure of the mixture 34. It is also noted that in particular embodiments, recovery section 38 includes a water separator 40 configured to separate water from the upgraded crude oil, which exit the recovery section 38 at 42 and 44, respectively.

An aspect of the present invention is thus the gradual heating of reaction mixture 22, including an HCO stream and water, flowing through reactor section 24, on a time scale configured to promote, at relatively low temperatures, the disaggregation of HCO components and their substantially uniform distribution in the matrix of the reaction mixture, and additionally at higher temperatures upgrading reactions, all the while minimizing or preventing coking. It is noted that the use of tube reactors in petrochemical processing to effect chemical transformations is commonplace. For example, it is the standard approach for cracking of gas-phase naphtha at temperatures in excess of 800° C. to produce ethylene. It is noted, however, that the use of tube reactors to effect the chemical transformation of liquids at the relatively lower temperatures is rather uncommon or absent in commercially relevant processes used in either in refining or petrochemical operations.

Another aspect of the present invention is that instead of the reactor having a substantially uniform temperature distribution, the flowing mixture 22 instead experiences a deliberately non-uniform application of heat (thermal flux) between the inlet 28 and the outlet 30. Though not wishing to be bound by any particular theory of operation, the belief is that the aforementioned approach facilitates upgrading by fostering sequentially two different physico-chemical processes. First, as discussed briefly above, the use of time and the application of progressively increasing temperatures between the inlet and outlet of the reactor section serves to disintegrate physical structures in HCO and/or effect the dissolution of HCO components to yield a substantially uniform dispersion by the point where the mixture reaches a temperature of about 80% to about 90% of the predetermined maximum temperature at some point before the outlet. The process of disaggregation, disintegration, or destructuring of assemblages of HCO components and the dispersing and/or dissolution of the same will be inclusively referred to hereinafter as the disaggregation reaction or simply disaggregation. Through disaggregation, asphaltenes and other heavy compounds that are generally associated in HCO are thought to be dispersed and nominally separated from one other, predisposing them to undergo upgrading reactions involving water and minimizing the possibility that they thereafter will undergo retrograde reactions with each other that lead to the formation of more and larger asphaltenes molecules and possibly coke. The process that yields product qualities such as density and viscosity that are improved over those of the HCO feed due to upgrading reactions involving heavy components originating in HCO will be referred to inclusively as the upgrading reaction or simply upgrading.

Figure 10:
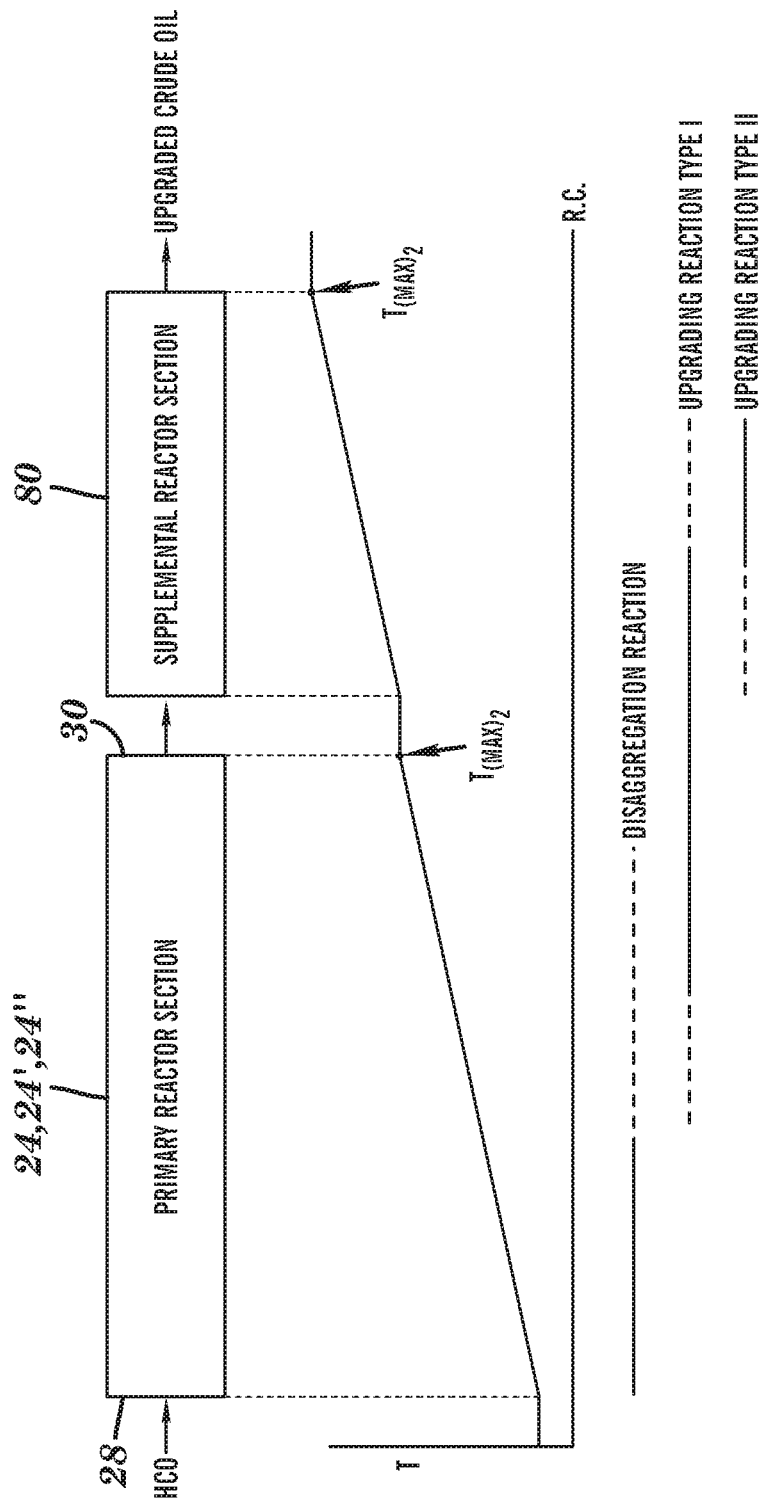
FIG. 10 is a schematic diagram of still other reactor portions usable with embodiments of the present invention.

It will be understood that the embodiments shown and described herein for upgrading HCO do not purport to selectively and/or exclusively promote first the initial disaggregation reaction and subsequently the upgrading reaction, nor is there a presumption that the latter occurs only when the temperature of the reaction mixture reaches and exceeds temperatures of between about 80% and 90% of the predetermined maximum temperature. Rather, the reaction mixture will predominantly undergo disaggregation reactions at lower temperatures in the reactor section while upgrading reactions occur predominantly at the higher temperatures in the reactor section. Indeed, as shown in FIG. 10 (discussed in greater detail hereinbelow) an aspect of embodiments of the present invention is the fostering of the disaggregation of HCO components prior to their being subjected to conditions of elevated temperature at which upgrading reactions occur, maximizing the efficiency and extent of upgrading at the highest temperatures while minimizing undesirable side reactions that lead to coke formation.

Figure 2:
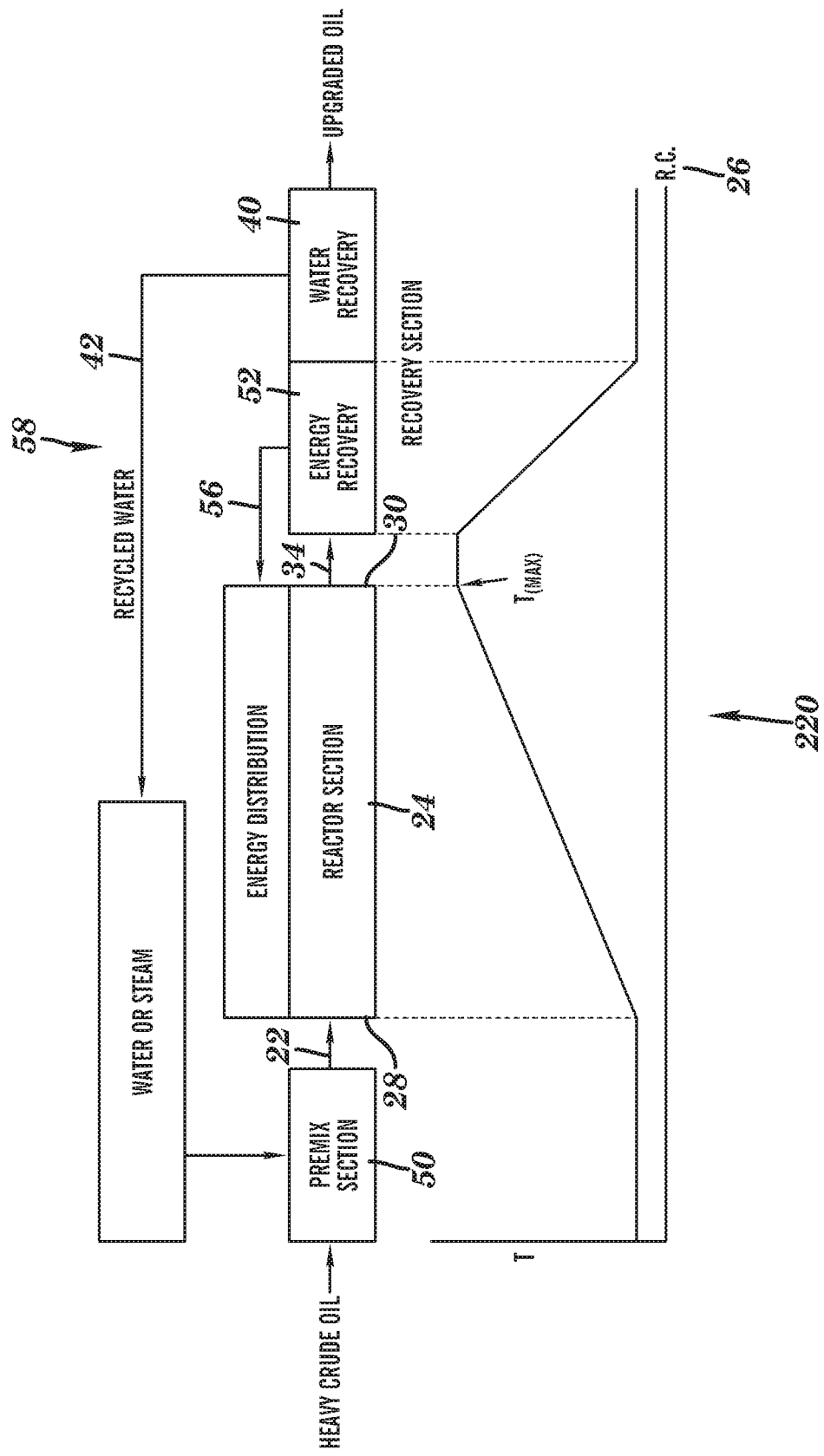
FIG. 2 is a schematic diagram of the embodiment of FIG. 1, with various optional features.

Turning now to FIG. 2, the controlled, progressive increase in the temperature of the reaction mixture between the reactor section inlet and outlet is but one aspect of the present invention that preferentially promotes, first, the disaggregation reaction and then the upgrading reaction. An additional approach for promoting disaggregation and upgrading reactions associated with various embodiments of the present invention involves the selection and contacting of the HCO stream in a premix section with materials selected to promote one or both of those reactions. In one embodiment of the invention, HCO flowing through a premix section 50 is contacted with a material including either water or steam at a temperature at or below the desired predetermined inlet 28 temperature of the process stream 22, e.g., at a temperature at or below about 200° C. In another embodiment the temperature of the water or steam contacting HCO flowing through the premix section may be as high as about T(max)1 or about 350° C., whichever is lower so as to avoid the promotion of localized cracking of HCO components at or near the point of contacting, which is thought to lead to coke formation. The mixture of HCO and this water or steam becomes the process stream 22 that is fed to the reactor section 24 at inlet 28.

Not wishing to be bound by any particular theory of operation, it is believed that the contacting of HCO, which has not substantially undergone disaggregation, with water whose temperature is greater than about 325° C. may promote coking due to localized high rates of cracking at or near the point of contacting followed by retrograde intermolecular reactions of components that are not substantially disaggregated within the reaction mixture 22. Thus, while coke formation by this mechanism may be minimized by ensuring that HCO components are substantially disaggregated prior to contacting with water that is supercritical (temperature and pressure are equal to or greater than about 374° C. and 3200 psia) or near-supercritical (e.g. temperature and pressure are in the range of about 325° C. to 374° C. and 2000 psia to 3200 psia, respectively), it is expected to be reduced even further through the promoting of disaggregation and the contacting with water whose temperature is less than about 325° C.

Thus, as shown, system 220 of FIG. 2 is substantially similar to system 20 of FIG. 1, while also including an optional premix section 50 for contacting the HCO with water or steam to form the process stream 22. As also shown, the recovery section of system 220 includes an optional energy recovery subsection (e.g., heat exchanger) 52, which is configured to recover thermal energy from the product mixture 34 and to distribute the recovered energy to the reactor section 24 as shown at 56. The energy removed from the mixture 34 is shown graphically as a reduction in temperature (T) as a function of R.C. 26. Still further, system 220 may include an optional water recycling loop 58 configured to recirculate the water 42 recovered at water separator 40, to the premix section 50, although it will be understood that other embodiments water used in contacting HCO in the premix section and/or the reaction mixture in the reactor section (discussed in greater detail hereinbelow) may be from sources instead of or in addition to water from the recycling loop.

Figure 3:
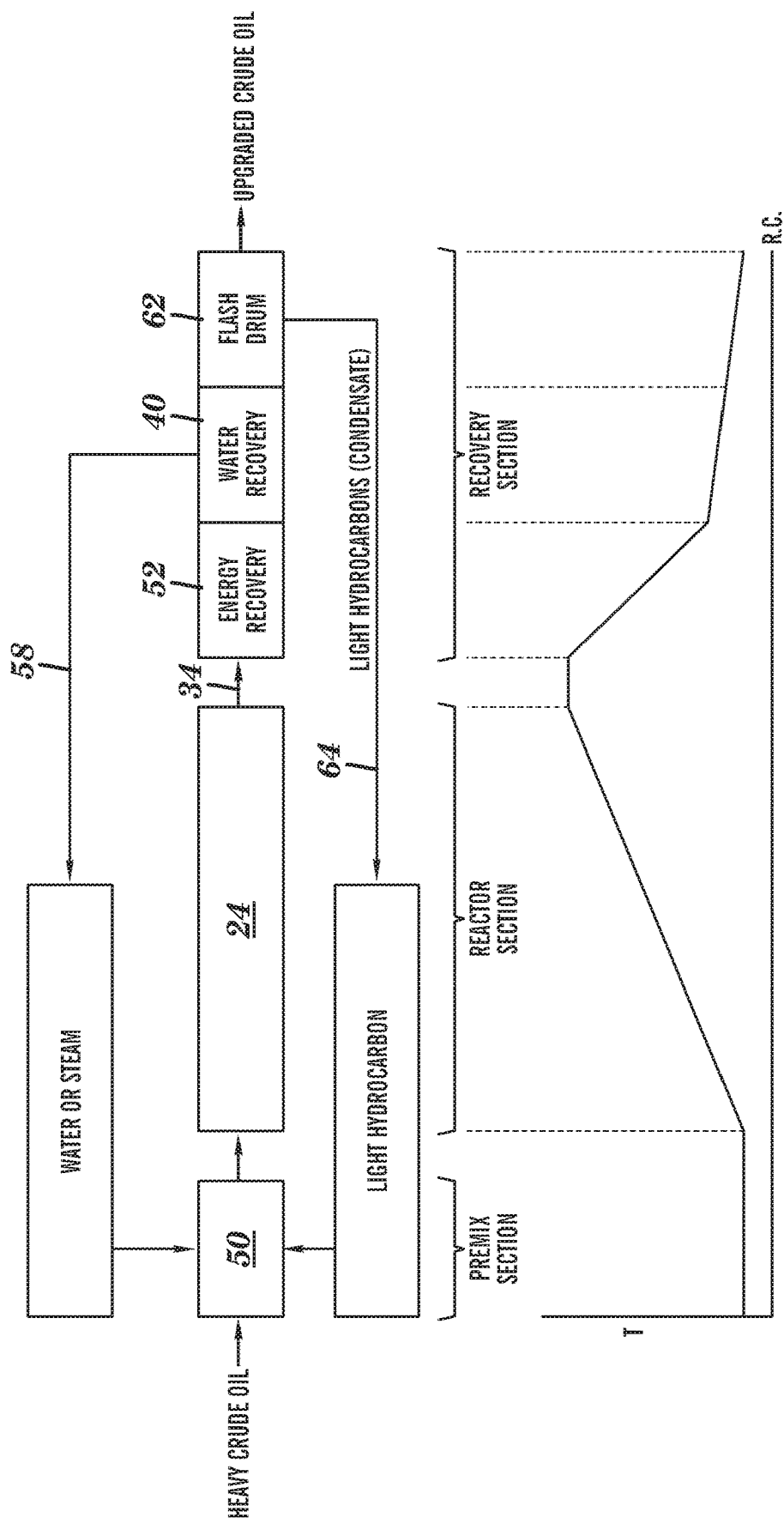
FIG. 3 is a schematic diagram of the embodiment of FIG. 2, with further optional features.

Turning now to FIG. 3, in another variation of the foregoing, a system 320 is substantially similar to system 220, with the addition to the recovery section of an optional light hydrocarbon removal device 62. An example of a suitable device 62 may include a conventional flash drum configured for recovering light hydrocarbons (e.g., naphtha, distillates, condensates and the like, hereinafter referred to simply as LHC) from the product mixture 34. The recovered LHC may then be recirculated via hydrocarbon recycling loop 64 back to the premix section 50, to help promote the disaggregation reaction.

Figure 4:
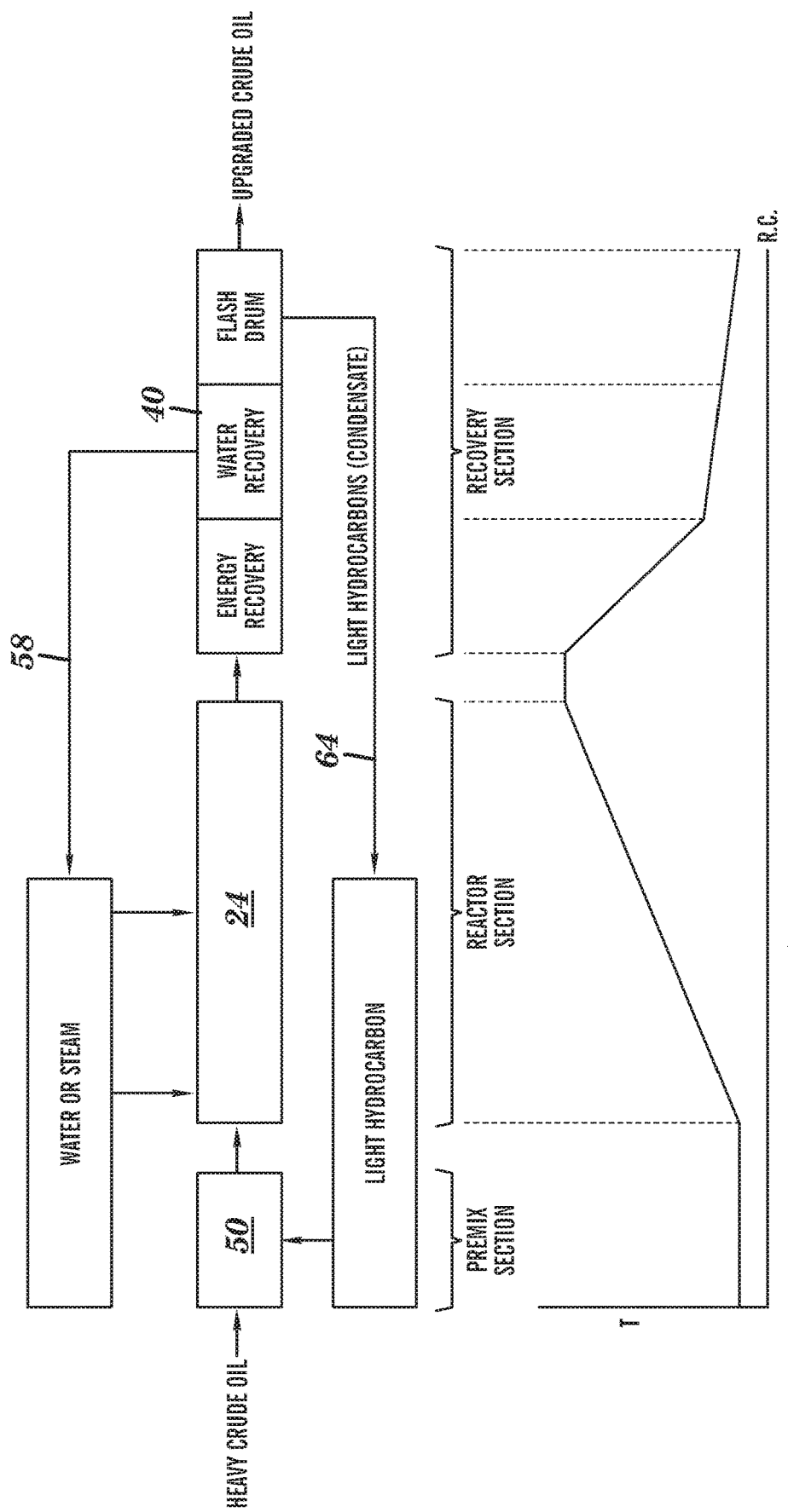
FIG. 4 is a schematic diagram of the embodiment of FIG. 3, with additional optional features.

Turning now to FIG. 4, in yet another variation of the foregoing embodiments, a system 420 is substantially similar to system 320, with the optional injection of water or steam (e.g., from recycling loop 58) at one or more points in reactor section 24 instead of the premix section 50. This effectively provides for contacting the HCO stream with the hydrocarbons, and therefore promoting the disaggregation reaction, prior to contacting the HCO with water or steam, which may be particularly effective for predisposing the reaction mixture 22 toward mixing with injected water or steam and undergoing upgrading reactions involving water at the higher temperatures found in the reactor section 24.

Figure 5:
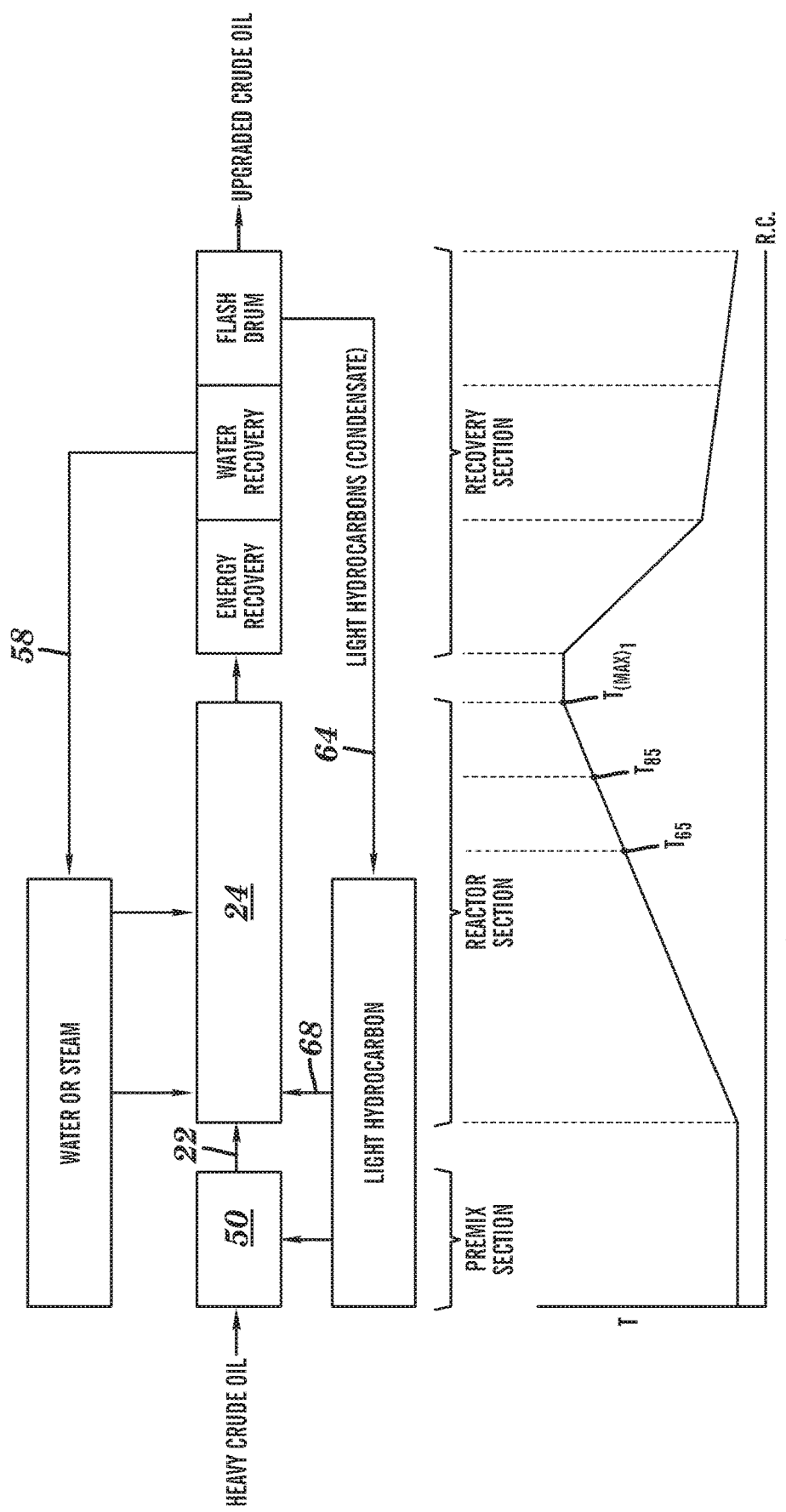
FIG. 5 is a schematic diagram of the embodiment of FIG. 4, with an additional optional feature.

In another variation shown in FIG. 5, a system 520 is substantially similar to system 420, with the optional injection of light hydrocarbon from recycling loop 64 into the reactor section 24 as well as premix section 50. It is noted that in particular embodiments, the injection of light hydrocarbon occurs at one or more points 68 prior to where the reaction mixture 22 has reached a temperature $T_{85}$ of between about 80% to 90% of the temperature T(max)1. In other embodiments, the injection of light hydrocarbon occurs at one or more points 68 prior to where the reaction mixture 22 has reached a temperature $T_{65}$ of between about 60% to 70% of the temperature T(max)1.

Figure 6A:
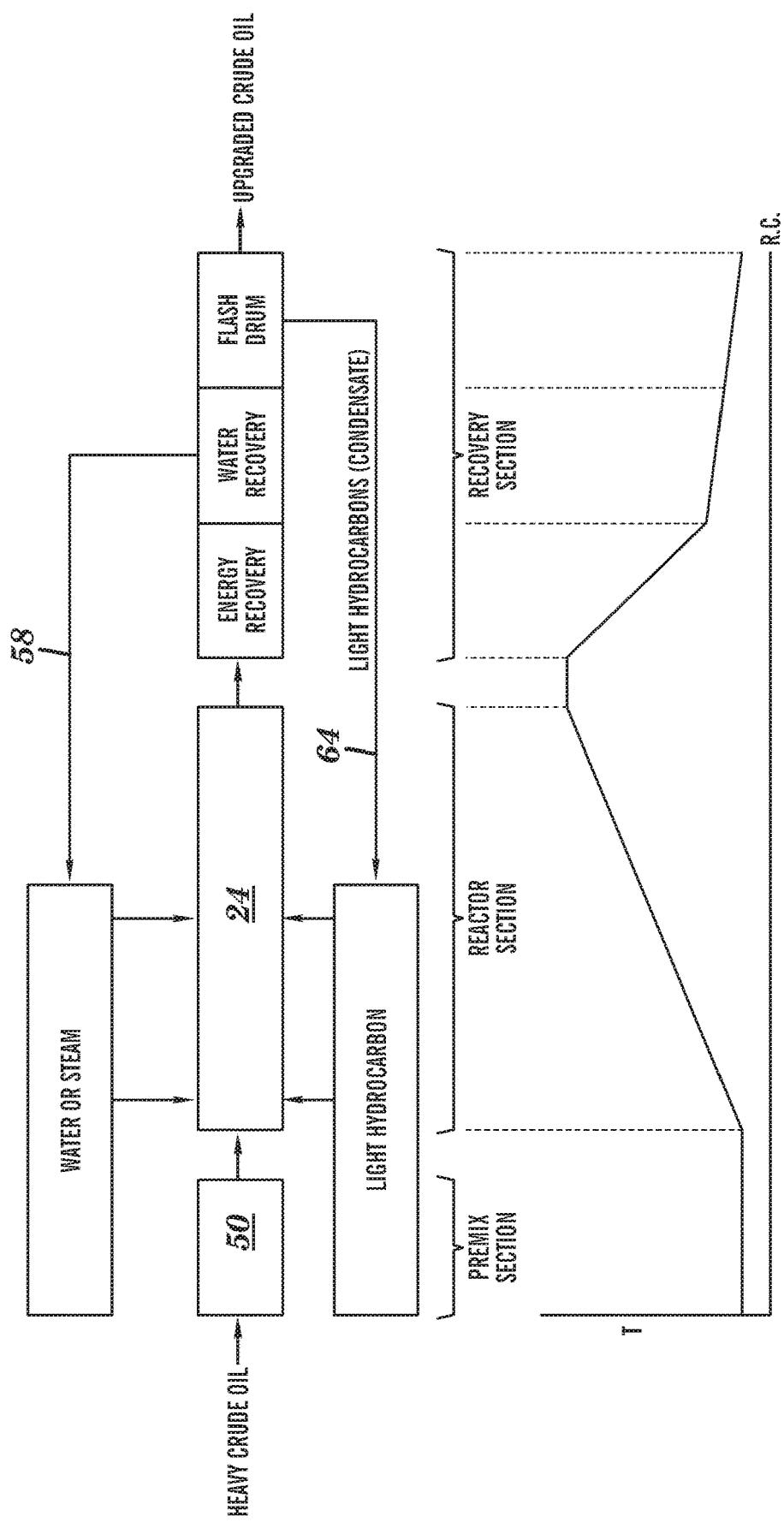
FIG. 6A is a schematic diagram of the embodiment of FIG. 3, with an additional optional feature.
Figure 6B:
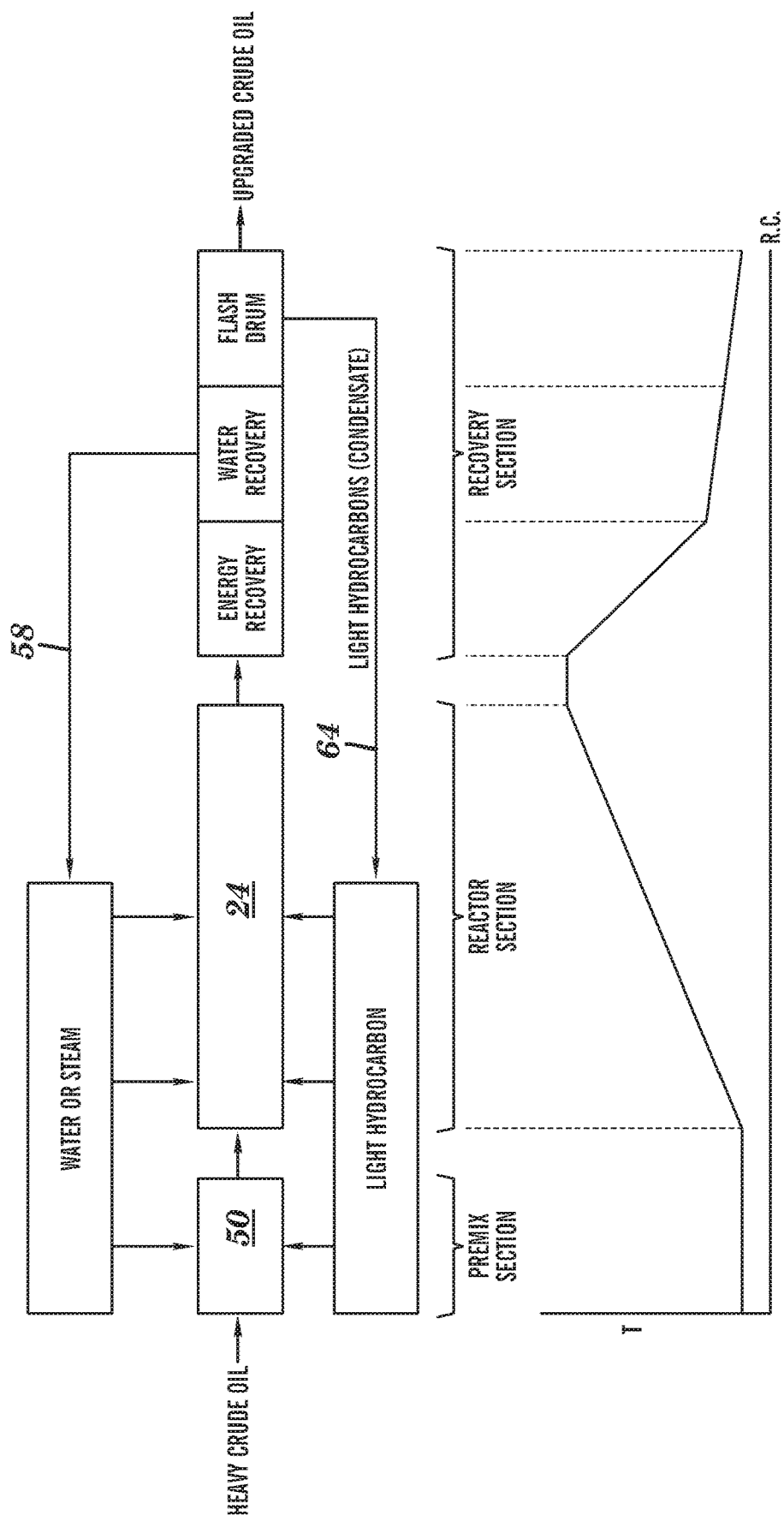
FIG. 6B is a view similar to that of FIG. 6A, with other optional features.

Turning now to FIG. 6A, system 620 is substantially similar to system 520, with the injection of light hydrocarbon and water/steam into reactor 24 without any injection into premix section 50. Thus, in this embodiment, no material is mixed with the HCO in the premix section (the premix section 50 is thus not required, although shown), although the HCO may contain water and/or LHC as the result of the steam assisted gravity drainage (SAGD) process in widespread use in Alberta for extracting and producing HCO from oil sands deposits, which HCO may be upgraded by embodiments of the present invention. Rather, water or steam are injected at one or more points in the reactor section 24 prior to the $T_{85}$ or $T_{65}$ points as discussed hereinabove. In this embodiment, it is also noted that at the point of injection the temperatures of the water or steam supplied by loop 58 may be equal to or less than about 80% to 90% of the predetermined maximum temperature in the reactor section T(max)1. In another embodiment, the temperature of the water injected into the reactor section may have temperatures greater than T(max)1 but less than about 350° C. System 620' of FIG. 6B is substantially similar to system 620, but with the additional injection of water/steam and hydrocarbon via loops 58 and 64, respectively, into premix section 50.

It is noted that in any of the embodiments shown and described herein, the contacting of water/steam and/or hydrocarbon with the HCO may be facilitated by a variety of conventional means including but not limited to mechanical stirring, inline mixing, static mixing, a mixing eductor, a radial (vortex) premixer, and/or a pump that continuously drives the reaction mixture 22 from the premix section 50 into the reactor section 24. Moreover, the examples shown and described herein are not intended to be limiting, with other combinations of injecting water/steam and hydrocarbons into the premix and reactor sections being included within the scope of the present invention.

Still further, in various embodiments described herein, the amount of water/steam and hydrocarbon supplied to the HCO in process stream 22 is configured to provide a final ratio of HCO to water (HCO:water) ranges from about 1:1 and 20:1, while the ratio of native HCO to LHC not native to the HCO (HCO:LHC) ranges from about 1:2 and 20:1. It is noted that the non-native LHC may be present in the HCO stream flowing into the premix section 50 or may be that which is introduced in either the premix section 50 or the reactor section 24.

The selection of the particular final value for HCO:water may be based on the balancing of two opposing factors. Higher relative concentrations of water may be beneficial in that they foster improved heat transfer from the walls of tube in the reactor section 24, suppress coke formation by quenching or preventing reactions between HCO components, and improve the kinetics of upgrading reactions involving water. Some disadvantages of relatively high water concentrations relate to the fact that displacement of HCO by water reduces the effective throughput of HCO while increasing operating costs due to the need to invest thermal energy to heat not only HCO but also water. Given that the heat capacity of the latter is approximately twice that of HCO and other hydrocarbons, each incremental increase in the water content of the reaction mixture requires proportionately more thermal energy to heat the reaction mixture to T(max)1. Because, in comparison with water, added light hydrocarbon is thought to be particularly effective for promoting the disaggregation reaction while suppressing the formation of coke, particular embodiments of the present invention, as discussed hereinabove, involve the initial contacting of the HCO by light hydrocarbon in the premix section 50 and the injection at one or more points later in the process (e.g., in the reactor section 24) of a minimum amount of water required to effect the desired level of upgrading without formation of unacceptable levels of coke. It will be understood that examples given hereinabove, which depict the contacting of HCO in the premix section and/or the reaction mixture in the reactor section by LHC recovered directly from the product mixture by the LHC removal device 62, are nonlimiting. In other embodiments, LHC may be used for such purpose which come from sources other than or in addition to the optional device 62.

Figure 7:
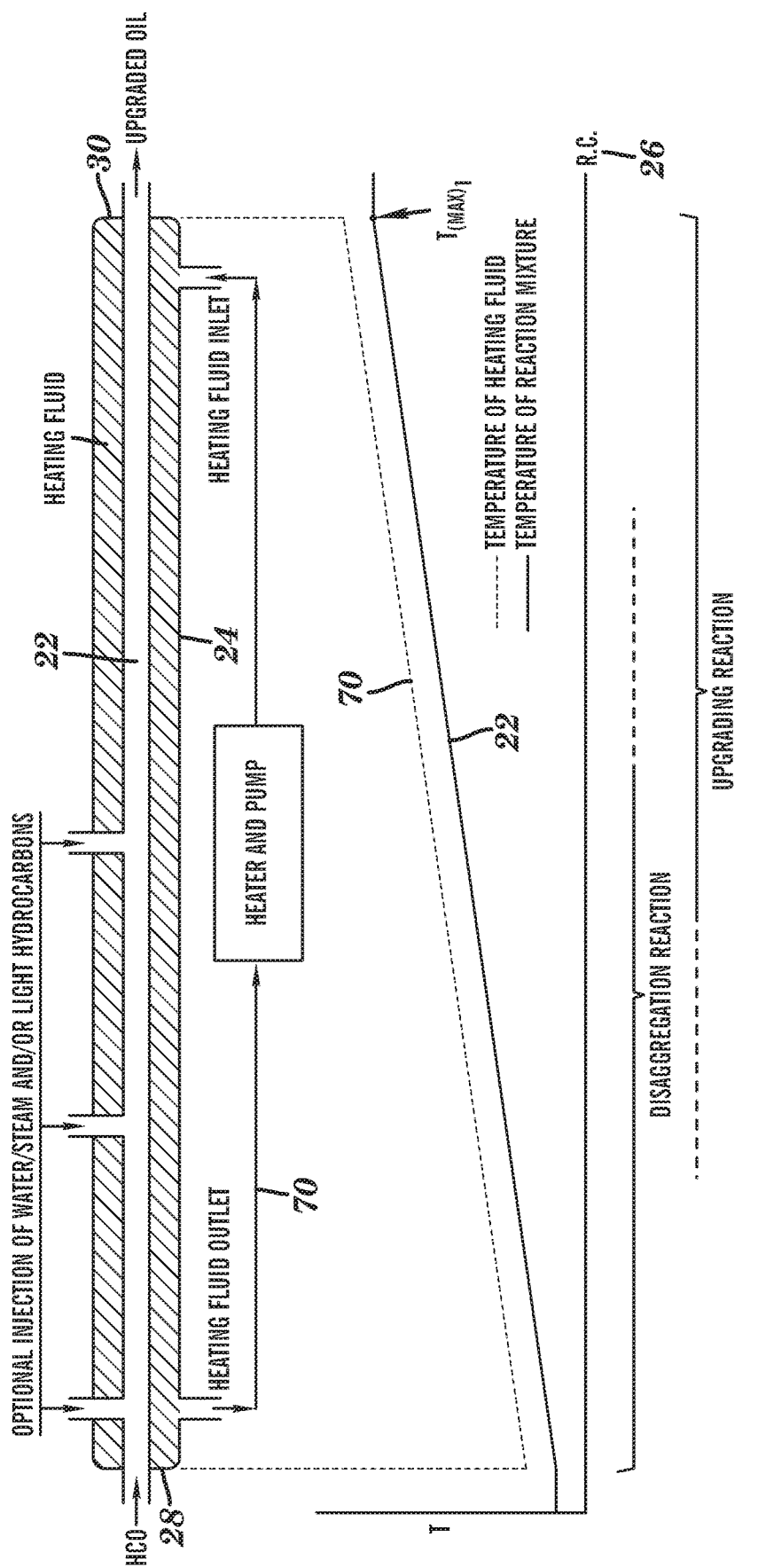
FIG. 7 is a schematic cross-sectional view of a reactor suitable for use in one or more of the embodiments of FIGS. 1-6B, with temperature represented graphically thereon.

Referring now to FIG. 7, in a nonlimiting example, the reactor section 24 is a conventional shell-and-tube heat exchanger in which the reaction mixture 22 flowing through a central tube is heated by a heating fluid 70 flowing in the direction opposite that of the reaction mixture 22. The heating fluid 70 flowing into the shell has a temperature sufficient to ensure that the temperature of the reaction mixture 22 at the outlet 30 of the reactor section 24 is at about the predetermined maximum temperature T(max)1. The flow rate and temperature of the heating fluid are adjusted to create a continuously-varying temperature profile along the length of the reactor section 24 as shown and described hereinabove with respect to the graphical components of the Figures. The temperatures of the reaction mixture 22 and the heating fluid 70 are shown graphically as a function of the reaction coordinate 26. The graphical component of FIG. 7 also indicates that the occurrence of the disaggregation reactions predominates at the inlet/low temperature end 28 of the reaction section 24, while the upgrading reactions predominate at the outlet/high temperature end 30 of the reaction section 24.

As also mentioned hereinabove, although reactor section 24 may take the form of a single-tube heat exchanger, the skilled artisan will recognize that reactor section 24 may alternatively include a heat exchanger having a plurality of parallel tubes within the shell, wherein the inlets of all the tubes are communicably coupled by a common inlet chamber and the outlets are communicably coupled by a common outlet chamber, such as shown in FIG. 11.

Figure 8:
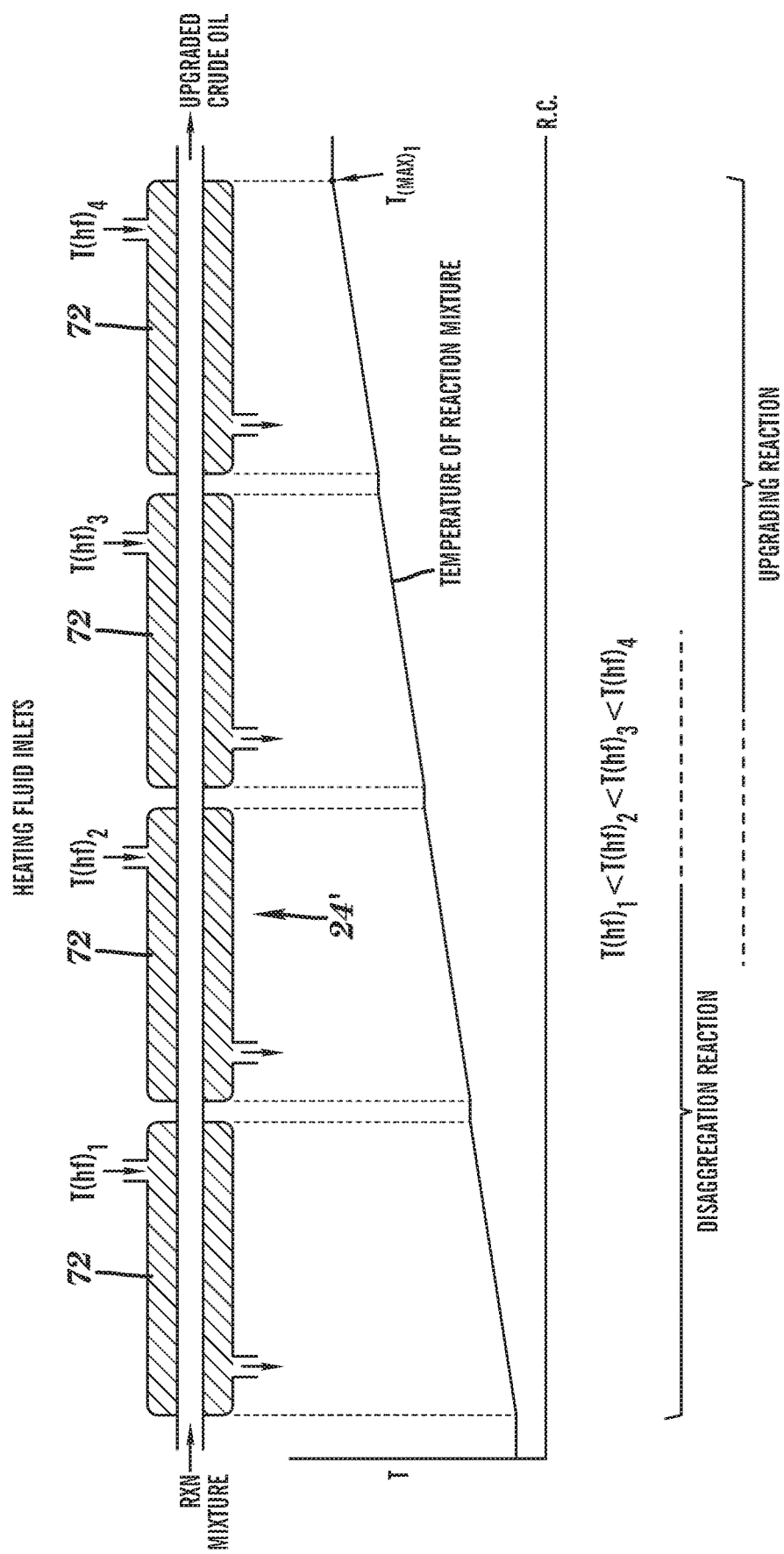
FIG. 8 is a view similar to that of FIG. 7, of an alternate reactor.

Turning now to FIG. 8, an alternate reactor section shown at 24' may take the form of a series of shell-and-tube subsections 72, where $T(hf)_i$ is the temperature of the heating fluid 70 at the inlet to each subsection. Reactor section 24 is otherwise substantially similar to reactor section 24, such as described with respect to FIG. 7.

Figure 9:
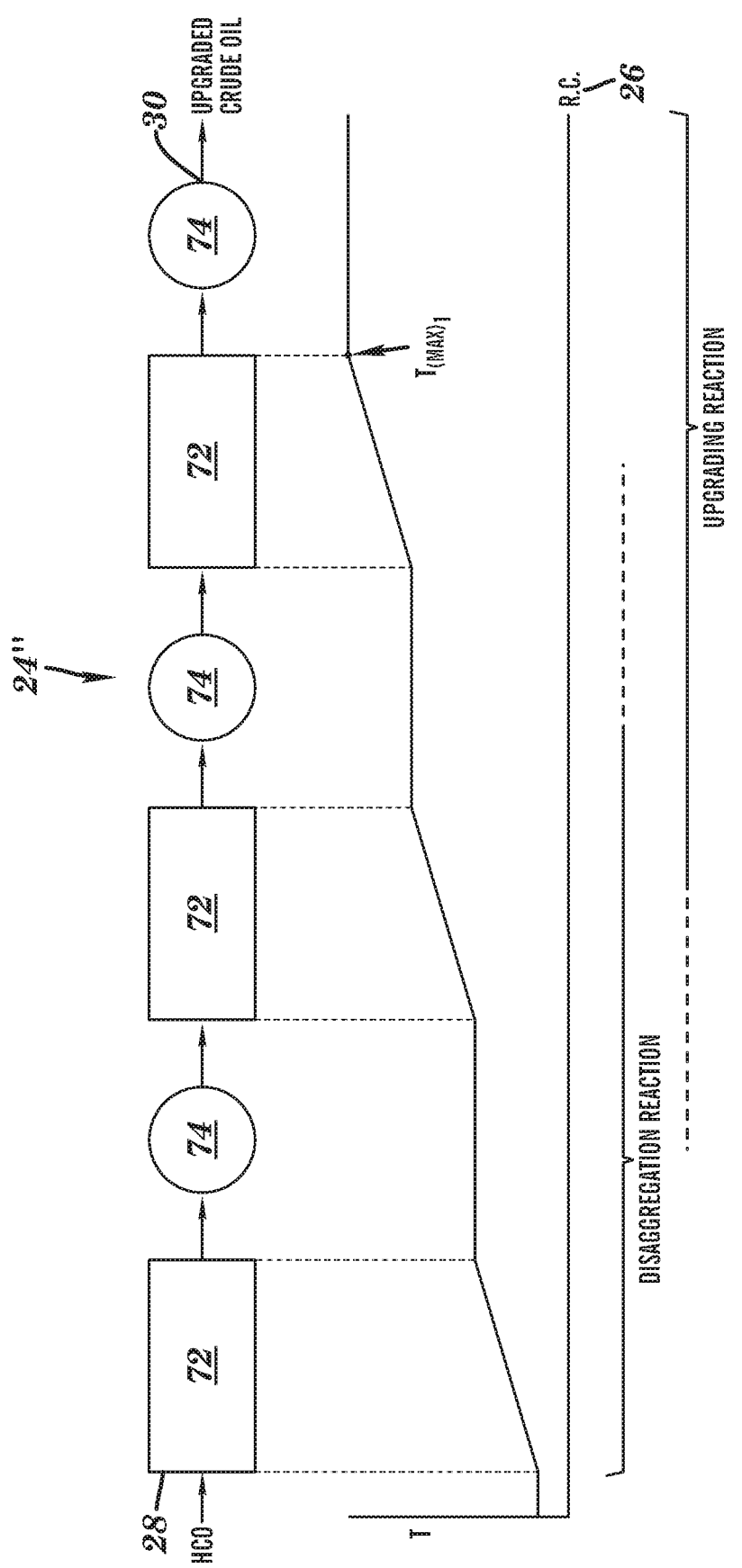
FIG. 9 is a schematic diagram of another alternate reactor portion usable with embodiments of the present invention.

Referring to FIG. 9, an optional reactor section 24" is substantially similar to reactor section 24', but with the interposition of thermal-soak chambers 74 disposed serially between the subsections 72. As shown graphically, the thermal-soak chambers 74 are configured as insulated, unheated flow-through chambers that effectively lengthen the residence time of the reaction mixture 22 at various temperatures as the mixture 22 flows through the reactor section 24". As shown graphically, the thermal-soak chambers 74 effectively provide a substantially step-wise increase in temperature as a function of the R.C. 26, e.g., along the length of the reactor section 24". The particular temperatures and the resulting residence time at those temperatures may be selected to facilitate kinetics related to the disaggregation and upgrading reactions. Moreover, although in particular embodiments the thermal-soak chambers 74 will be unheated, it should be recognized that in particular applications, it may be appropriate to apply some amount of heat to the thermal-soak chambers, such as may be desired to maintain the reaction mixture flowing therethrough at an approximately uniform temperature.

As discussed above, the graphical component indicates that the occurrence of the disaggregation reactions predominates at the inlet/low temperature end 28 of the reaction section 24", while the upgrading reactions predominate at the outlet/high temperature end 30 of the reaction section 24". It should be recognized that any number of the reactor subsections 72 of FIGS. 8 and 9 may be used, depending on the particular application. It should also be recognized that in various embodiments, pressure within the various components of reactors 24, 24', 24", is maintained at levels sufficient to prevent the formation of a phase separate from the liquid phase of reaction mixture 22, as discussed hereinabove.

Turning now to FIG. 10, any of the aforementioned reactor portions 24, 24', 24" may be further modified to include a supplemental reactor section 80 serially disposed at outlet 30 thereof. It is noted that supplemental reactor section 80 may be substantially similar to reactor section 24, 24', 24" and/or one or more reactor subsections 72. As shown, reactor section 24, 24', 24" effectively brings the reaction mixture 22 to T(max)1 as described hereinabove, while the supplemental reactor section 80 is configured so that the reaction mixture flowing therethrough achieves a predetermined maximum temperature T(max)2. In particular embodiments, T(max)2 is within a range of approximately 1.0 to 1.1 times T(max)1, and in other embodiments, is within a range of approximately 1.1 to 1.4 times T(max)1, as will be discussed in greater detail hereinbelow. Examples of reactor sections 24, 24', 24" and energy recovery sections 52 which include multiple parallel process flow paths as discussed hereinabove, disposed in series, are shown in FIG. 11.

In the foregoing embodiments employing serial heat exchangers, the temperature and rate of heating fluid flow through each shell may be individually controlled to control the temperature and rate of heat applied to the reactions mixture 22. Moreover, as also discussed hereinabove, the reaction mixture is maintained at pressure sufficient to maintain the reaction mixture as a single phase throughout the reactor section. Doing so is important from the viewpoint of process energetics because in general, liquid-to-gas phase changes consume significant energy as a function of the heat of vaporization, $\Delta H_{vap}$. The importance of this issue is particularly acute given that $\Delta H_{vap}$ for water may be 5-9 times higher than for many lower molecular weight hydrocarbons. Therefore, in a particular embodiment of the present invention, the reactor section is operated at pressures in excess of those required to maintain the reaction mixture in liquid phase when the reaction mixture experiences the maximum temperature in the reactor section. Higher pressures may also enhance the kinetics of the disaggregation reaction, the upgrading reaction, or both. Yet, any such benefit may be offset by higher equipment costs and operating costs, which include equipment maintenance. Therefore, in a particular embodiment of the present invention the reactor section is maintained at an operating pressure that is approximately 5% to 10% in excess of that required to maintain the reaction mixture as a liquid phase. That pressure varies as a function of the predetermined maximum temperature in the reactor section; the amount and chemical composition of LHC in the reaction mixture, whether they are native to the HCO, added to enhance disaggregation reactions, or generated through upgrading reactions; and the amount of water in the reaction mixture. Various embodiments use pressures within a range of from about 1500 to about 3000 psia. Under some conditions of temperature and reaction mixture composition, the required operating pressure may be approximately 2000 psia, while under other conditions the required pressure may be from about 1500 psia to about 2000 psi, while under yet other conditions the required pressure may be from about 2000 psi to approximately 3000 psia.

In various embodiments of the present invention, the predetermined maximum temperature at the outlet from the reactor section is kept as low as possible in consideration of energy costs, the aforementioned costs associated with building and maintaining processing equipment, and of the desire to minimize coke formation. However, doing so works at cross-purposes to the promotion of the disaggregation and upgrading reactions, which are enhanced as a function of increasing temperature. Consequently, another processing variable that plays a role in chemical kinetics must be exploited, namely, time.

The shell-and-tube configuration of the reactor section provides two important benefits, one stated and one implied. The former relates to the possibility for creating a deliberately non-isothermal temperature regime to preferentially promote disaggregation before applying maximum thermal energy to achieve predetermined maximum temperatures and drive upgrading reactions involving water. The implied benefit is the well-known enhancement of heat transfer by means of the high ratio of surface area to volume (surface:volume) available in tubular reactors. Yet, the latter benefit is achieved at the price of pressure drop between the inlet and outlet as a function of increasing tube length and decreasing tube cross-sectional dimension, both of which increase surface:volume. Therefore, the idea of increasing the total time spent by the reaction mixture in the reactor section by increasing the tubing length seems dubious. And though the problem may be mitigated by a variety of means, it ultimately is bounded by the interplay between three variables: the number and lengths of the tubes inside of a shell-and-tube system; the viscosity of the mixture flowing through them; and flow rate. The possibilities for reducing viscosity by increasing temperature or decreasing the amount of HCO relative to added light hydrocarbon or water are limited, as these measures tend to work in opposition to other considerations related to upgrading optimization. Similarly, reducing the flow rate serves primarily to reduce the throughput of HCO.

The present inventor's solution to the problem resides in an approach that reduces pressure drop by effectively increasing the diameters of tubes in the reactor section, which at first seems counterintuitive and even contrary to a key benefit noted for tubular reactors, namely, that they offer a high ratio of surface area to volume. However, in particular embodiments of the present invention, one or more flow-through chambers (thermal soak chambers) 74, that are only insulated and not heated will be interposed between individual reactor subsections, where the volume of the flow-through chambers 74 is equal to about the desired increase in residence time multiplied by the flow rate through the reactor section. For example, a single such chamber 74 of volume $V_C$ located in the reactor section before the $T_{85}$ point could increase by an average of one minute the time for the disaggregation reaction if $V_C=1$ minute×$F_{RM}$, where $F_{RM}$=the flow rate of the reaction mixture through the reactor section in units of volume/minute. (This does not take into account, of course, the consequence of flow-based mixing that might occur in the flow-through chamber.) Similarly, in another particular embodiment of the invention, the reactor section 24, 24', 24" is extended by the location of an insulated, unheated flow-through chamber 74 of volume $V_C=m\times F_{RM}$ at the outlet of the last shell-and-tube subsection in the reactor section where the reaction mixture is heated to about the predetermined maximum temperature T(max)1, resulting in the increase by m minutes the time available for upgrading reactions, where $F_{RM}$ is the flow rate of the reaction mixture in units of volume/minute. In yet another particular embodiment, the throughput of the upgrading system may be increased without significantly increasing the pressure drop across the reactor section by increasing the size of the flow-through chamber 74 installed at the outlet from the last shell-and-tube subsection, the size and number of flow-through chambers 74 interposed between the inlet and outlet, and the number of tubes contained in the shell-and-tube subsections 72. More than one shell-and-tube subsection 72 may be installed between the chambers 74.

Though not wishing to be bound by any particular theoretical reasoning, upgrading reactions in the reactor section of the instant invention are thought to be of two general types discussed briefly hereinabove. In the heterolytic scission of the covalent bond between two atoms, the electron pair is divided asymmetrically whereas homolytic scission results in the bonding electron pair being divided equally between the two bonded atoms. For convenience, the heterolytic and homolytic reactions of HCO components are discussed herein will be referred to hereinafter as upgrading reactions Type I and Type II, respectively. In the absence of catalysts, homolytic reactions may be promoted at elevated temperatures, an important example being the production of ethylene through the gas-phase cracking of naphtha at temperatures of about 850° C. Being highly endothermic ($\Delta H°$ has a high positive value), the entropy term of the Gibbs Free Energy equation $\Delta G°=\Delta H°-T\Delta S°$ prevails under such conditions. By contrast, heterolytic reactions may be promoted by catalysts that facilitate reactions by lowering the activation energy, which is generally desirable as this allows reactions to occur at lower temperatures than would be possible without a catalyst. An example is fluidized catalytic cracking (FCC) in refineries where FCC units play a vitally important role by increasing the yields of gasoline obtained from crude oil through the cracking of heavier hydrocarbons to form lighter ones. FCC catalysts are fine powders that function as a substrate onto which hydrocarbons adsorb in order for catalysis to occur. Other catalysts may be molecules that promote reactions by participating in them, in some cases being chemically integrated into reaction intermediates, but always being regenerated. The ability of water to function in this way is well known, and in a particular embodiment of the present invention, the reaction mixture in the reactor section is heated to a final predetermined temperature T(max)1 of about 260° C. to about 325° C. (or about 260° C. to about 400° C. in some embodiments) such that the upgrading rates due to water-catalyzed Type I reactions are thought to become significant when the reaction mixture reaches a temperature of about 80% to about 90% of T(max)1, where significant levels of homolytic cracking do not occur.

Though not wishing to be bound by any particular theory of operation, in particular embodiments of the invention the reaction mixture flows through a primary reactor section 24, 24', 24" and is heated to the predetermined maximum temperature T(max)1 where water-catalyzed Type I reactions are thought to occur without Type II reactions occurring at an appreciable rate, and then flows into a supplemental reactor section 80 (FIG. 10) appended to the primary reactor section where heating of the reaction mixture continues to a second predetermined maximum temperature of T(max)2. In this particular embodiment, the flow rate of, and the thermal flux into the reaction mixture are controlled to minimize or prevent coke formation in the reaction mixture as it is heated progressively while flowing through both the primary and the supplemental reactor sections.

In a particular embodiment, the predetermined maximum temperature T(max)2 of the supplemental reactor section 80 is between about 1.0 and 1.1 times T(max)1, the principal purpose of the supplemental reactor section being in this case to further drive Type I reactions to an extent beyond that which might have been achieved in the primary reactor section without appreciably fostering Type II reactions. In yet another embodiment, the supplemental reactor section raises the reaction mixture to a predetermined maximum temperature T(max)2 of between about 1.1 and 1.4 times T(max)1 to promote further upgrading by means of Type II reactions in addition to Type I reactions. Though not wishing to be limited by any particular theoretical reasoning, it is suspected that the benefit of such a strategy is that promoting first the Type I upgrading reactions in the primary reactor section reduces the average molecular weight of components in the reaction mixture to produce lighter compounds, which in turn serve to promote further disaggregation and even the dissolution of heavy components, minimizing the potential for coke formation or the retrograde formation of asphaltenes and other heavy components when subjected to thermal conditions conducive to Type II upgrading reactions in the supplemental reactor section.

In particular embodiments as discussed hereinabove, the recovery section 38 reduces the temperature of the product mixture to between about 60° C. and 200° C. The reduction in temperature results in a corresponding reduction in the vapor pressure of the product mixture and an increase in viscosity. Moreover, the product mixture 34 (FIG. 3) may flow under pressure through water separator 40, which may take the form of one or more liquid-liquid separators for the purpose of removing water. As discussed, recovered water can then be recycled in the process at 58 or used elsewhere, for example, it may be combined with water that is converted to steam for downhole injection in the context of the SAGD process for extracting HCO form oil sands. And as also discussed, in various embodiments, the product mixture from which water has been substantially removed flows into flash drum 62, having had its temperature reduced to a level appropriate to remove desired quantities of LHC at 64, e.g., by flash distillation of vapors, which LHC are referred to as condensate. The flash drum 62 may be appropriately configured to recover other volatile components in the product mixture that are lighter than condensate, which may include methane ethane, propane, hydrogen sulfide, $CO_2$, COS, $CS_2$, $SO_x$, and possibly nitrogenous compounds. In various embodiments as discussed above, the recovered condensate is used to facilitate the disaggregation reaction by contacting with HCO in the premix section 50 or injection into the reactor section 24, 24', 24".

Scalability is another among the many aspects of the present invention that have already been identified, and which are believed to be novel, non-obvious and beneficial. In particular, embodiments of the invention may be scaled without substantially changing the basic design to permit the construction of upgrading systems with capacities ranging from <1 barrel per day (bpd) to >10,000 bpd. This feature means that the present invention combines the best features of the two upgrading methodologies that enjoy broad use in Canada today. First, like the large, expensive technology used to produce synthetic crude oil, it offers the possibility to upgrade HCO to meet pipeline specifications without relying on dilution. Second, like diluent-based upgrading, the system and method described herein is suitable for distributed implementation on a smaller scale at or near wellheads and remote production fields.

Another aspect of the present invention is that particular embodiments maximize energy efficiency and ecofriendliness. For example, the recovery section 38 captures and recycles thermal energy and also water for reuse in the system and method described herein for upgrading HCO. Particularly beneficial is the ability to substantially minimize the thermal energy required to heat the reaction mixture to $T(max)1$, or to $T(max)2$, by substantially maximizing the ratio HCO:water. When the reaction mixture comprises only HCO and water, relatively large amounts of the latter are required because, apart from being involved in upgrading reactions, it is thought to be important for facilitating the dissociation and dispersal of HCO components in a water-dominated matrix. This latter function would not merely expose individual molecules such as asphaltenes to the upgrading reactions, but also suppress counterproductive retrograde or intramolecular reactions that could lead to the formation of undesirable products such as coke. By this strategy, the required amount of water relative to HCO is much greater than the minimum required only for actual upgrading reactions, and an energy penalty attaches to it because the heat capacity of water is approximately twice that of HCO. Embodiments of the instant invention address this dilemma by the mixing of HCO in the premix 50 and/or reactor 24, 24', 24" sections with LHC, e.g. those optionally recovered from the product mixture and recycled to the front end of the process, which are thought to facilitate disaggregation reactions without themselves being subject to appreciable additional chemical transformation in the reactor section. Subsequently, only the amount of water required to foster water-based upgrading reactions is added to the reaction mixture flowing through the reactor section. Not only does this approach help minimize energy requirements, but it offers the possibility to improve the kinetics of the disaggregation reaction because the LHC are presumably more effective than water in that regard.

Additional aspects of the invention concern the specific, deliberate design of the reactor section(s) to effect the gradual heating of the reaction mixture for the explicit purpose of a) avoiding levels of thermal flux into reaction mixture from the inside walls of the reactor to minimize or prevent coking; b) promoting disaggregation reactions by means of optionally contacting of HCO with LHC in the premix section and/or the reactor section; c) promoting disaggregation reactions prior to the reaction mixture reaching a temperature slightly below (e.g., between about 80% and about 90% of) the predetermined maximum temperature $T(max)1$; d) promoting upgrading reactions in a reactor section at temperatures between that point (e.g., about 80% to 90% of $T(max)1$) and about $T(max)1$ where Type I upgrading reactions are thought to occur; e) avoiding subjecting the HCO to localized heating at the point of injection of and contacting by water that has been heated to supercritical or near-supercritical temperatures when the HCO has not already undergone disaggregation, under which conditions the localized rate of heating exceeds the rate of disaggregation and instead promotes the formation of coke due to intermolecular reactions between HCO components and/or localized high rates of cracking, ostensibly by homolytic mechanisms; and f) optionally promoting further upgrading reactions in the reaction mixture flowing through a supplemental reaction section whose predetermined maximum temperature $T(max)2$ is between (i) 1.0 and 1.1 times $T(max)1$ where Type I reactions are thought to predominate, or (ii) 1.1 to 1.4 times $T(max)1$ where Type II upgrading reactions are thought to occur at the point in the supplemental reactor when the reaction mixture reaches a temperature greater than about 1.1 times $T(max)1$. It should be noted the various means described by which the invention minimizes the formation of coke effectively increase the yield of upgrading because coking converts HCO components into a low-value byproduct that has little value other than as fuel.

Heretofore the underlying concept of the instant invention has been to introduce the HCO feed to an upgrading process that is more or less linear: the feed flows continuously into a reactor or a series of reactor subsections after optionally flowing through a premix section; a reaction mixture is generated by contacting the HCO with LHC and/or water/steam at one or a plurality of points in the premix and/or reactor sections; the mixture is progressively heated in the reactor or plurality of reactor subsections to a predetermined maximum temperature $T(max)1$; it optionally flows through a supplemental reactor section where it is heated progressively to a second predetermined maximum temperature $T(max)2$; and the product mixture flowing therefrom is processed through a recovery section designed to remove water from the upgraded HCO product, recover thermal energy, and optionally recover LHC to be recycled to one or more upstream points for contacting with the HCO to aid in disaggregation believed to be an important for predisposing HCO to upgrading reactions with water. (The foregoing summary is provided by way of illustration, is not intended to describe all possible embodiments, and therefore is not limiting.) However, in other embodiments of the invention, one or more additional elements may be added into the process flowpath to create one or more branch points in the flowpath. These embodiments, which will now be described in greater detail, are intended to increase yet further the selectivity, efficiency, and effectiveness of the upgrading process. This in turn tends to increase control over the range and quality of products that can be obtained from the process, thereby opening up distinctive, new possibilities to enhance the economics of producing HCO by the SAGD process and upgrading it for transport to market.

Figure 12:
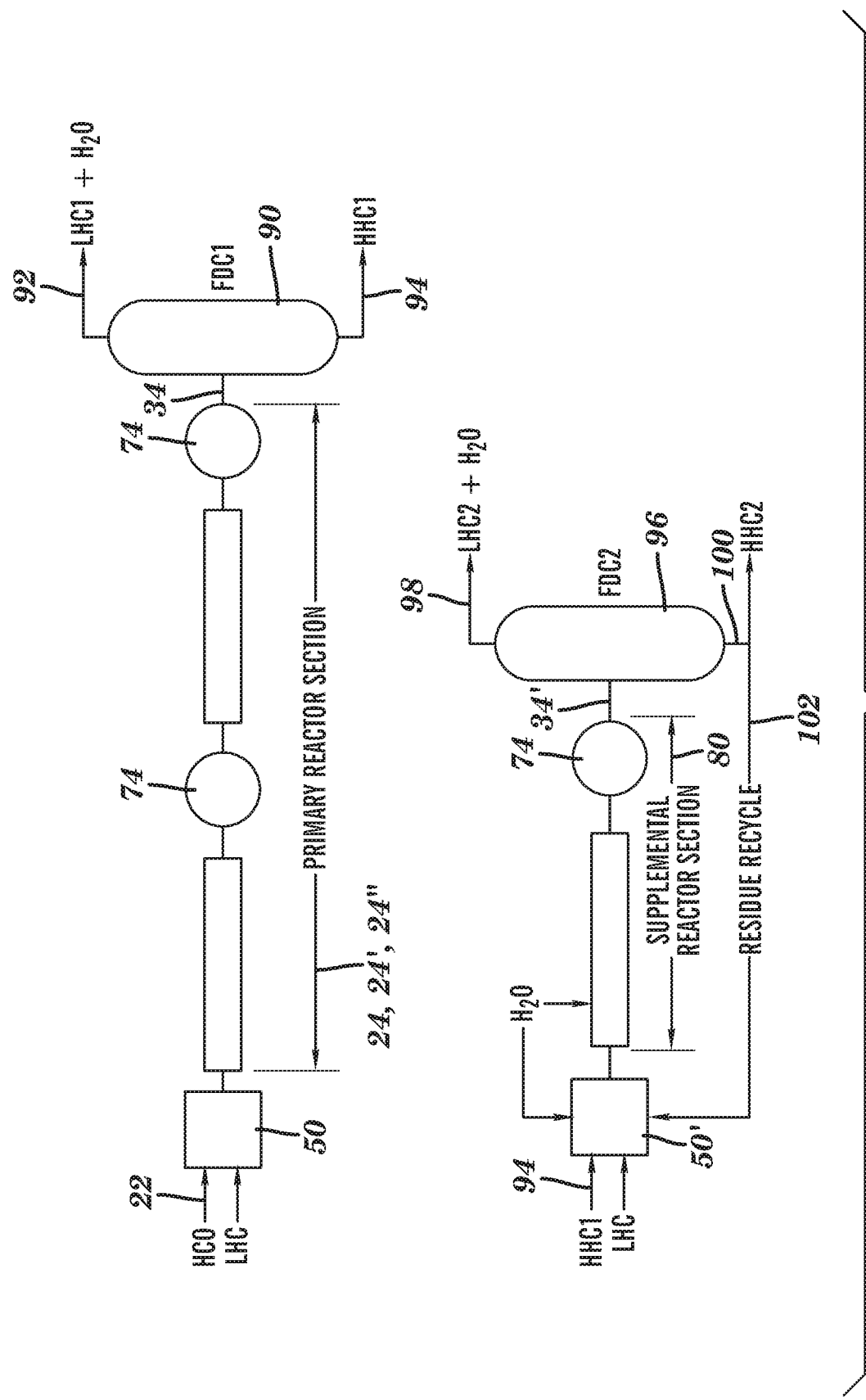
FIG. 12 is a schematic diagram of an alternate embodiment of a hydrothermal heavy crude oil (HCO) upgrading system of the present invention.

Referring to FIG. 12, the reaction mixture flows through the reactor section 24, 24', 24" such as shown and described hereinabove, including one or more subsections and optional thermal soak chambers interposed in the flow path. The product mixture then flows from the outlet 30 of the primary reactor section 24, etc., into a flash distillation column 90, also designated FDC1, wherein the product mixture is separated into two product fractions differentiated on the basis of the boiling point ranges for their respective components, which for simplicity will be referred to as light and heavy fractions 92 and 94, respectively. The light fraction 92 includes water and light hydrocarbons (LHC), the latter being designated LHC1 and having boiling points at atmospheric pressure below a predetermined maximum value of BP(LHC1), which in one embodiment is below about 280° C., while in yet another particular embodiment BP(LHC1) may be below about 220° C., and in yet another particular embodiment, it may be less than about 160° C. The heavy fraction 94, which may be referred to as the predominantly heavy hydrocarbon (HHC) product stream, the HHC residue, or simply HHC1, includes components in the product mixture 34 whose boiling points are higher than BP(LHC1). Components in light fraction 92 from FDC1 90 are cooled in a condenser (not shown) to yield liquid mixture that is separated into an aqueous phase and a hydrocarbon phase. By contrast, the HHC1 94, flows without having been cooled from the bottom of the distillation column 90 into an optional premix section 50' configured in the flow path between FDC1 90 and a supplemental reactor section 80 such as shown and described hereinabove.

Not wishing to be bound by any particular theory of operation, it is believed that LHC in the light fraction 92 includes compounds generated through upgrading reactions in the primary reactor 24, etc., in addition to LHC compounds that may be native to the HCO and any that may have been added in the premix 50, 50' and/or reactor 24, 24', 24" sections to promote disaggregation reactions. Additionally, it is believed that the HHC1 94 flowing from FDC1 90 includes compounds that either have undergone varying degrees of upgrading upstream from FDC1 90 but which on the whole may be susceptible to further upgrading. As such, they are the appropriate object of further upgrading in the supplemental reactor section 80. Due to their higher molecular weight (MW) compared with LHCs, the viscosity of HHC1 94 will vary directly as a function of LHCs removed by FDC1 90. Therefore, the operation of FDC1 90 should be optimized to ensure facile flow of HHC1 94 in a downstream manner from FDC1 90 and prevent HHCs from becoming so concentrated and highly associated as to reduce their proclivity to undergo further upgrading reactions in the supplemental reactor section 80.

Turning again to FIG. 12, HHC1 94 flowing downstream through premixer 50' to the supplemental reactor section 80 is heated progressively in a particular embodiment to a predetermined maximum temperature T(max)2 before reaching the outlet of the same, which temperature is between about 1.0 and 1.1 times T(max)1, the predetermined maximum temperature to which the reaction mixture is heated in the primary reactor section. Though not wishing to be bound by a particular theory of operation, in this embodiment the principal objective is to further drive Type I reactions, described previously in this specification, to an extent beyond that which might have been achieved in the primary reactor section, yet without fostering appreciable upgrading by means of Type II reactions in addition to Type I reactions. Given that much or most of the water present in the product mixture flowing into FDC1 90 is removed in the light fraction 92, HHC1 94 may be contacted with water or steam (such as recycled from light fraction 92) at one point or a plurality of points downstream of FDC1 94, e.g. in the supplemental reactor section 80 and/or the optional premix section 50' as shown.

In another particular embodiment, the supplemental reactor section progressively raises the reaction mixture to a predetermined maximum temperature T(max)2 of between about 1.1 and 1.4 times T(max)1 where Type II reactions are believed to occur. Given that such reactions are thought to be thermolytic instead of involving Type I hydrolytic mechanisms, the contacting of the HHC1 by water and/or steam in the premix section 50' and/or the supplemental reactor section 80 is optional. Nevertheless, said contacting may offer benefits aside from the possibility to promote further upgrading by Type I mechanisms. First, given that the thermal conductivity of water may be about 3-4 times higher than that of hydrocarbons including bitumen, the presence of just 5% to 10% water in the reaction mixture may increase the efficiency of thermal energy transfer from the walls of the shell-and-tube reactor to the HHC residue flowing therethrough, which is believed to minimize or prevent coke formation that would otherwise occur, for example at the walls of the shell-and-tube reactor. Additionally, not being bound by a particular theory of operation, the addition of water in controlled amounts may serve helpfully to prevent HHC components from becoming so concentrated and highly associated as to reduce their proclivity to undergo further upgrading reactions in the supplemental reactor section 80. However, as has been explained in detail elsewhere, the heat capacity of water is approximately twice that of hydrocarbons. Thus, in a particular embodiment of the present invention, the economics of HHC residue upgrading in the supplemental reactor section may be optimized by taking into consideration the quality and quantity of HHC residue fed thereinto; the quality and quantity of the upgraded hydrocarbon product flowing therefrom; and the amount of thermal energy applied, where the latter depends on 1) controlling the amount of LHC removed in FDC1 90 and the amount of water or steam mixed with the HHC residue flowing through the supplemental reactor section 80; and 2) the predetermined temperature T(max)2 to which the reaction mixture is heated.

Compared with the approach described earlier in this specification, at least four benefits may accrue through the removal of LHC from the reaction mixture flowing into FDC1 90 from the primary reactor section 24, 24', 24". First, it results in a reduction of the quantity of material that must be heated to a temperature of T(max)2. In the particular case where T(max)2 equals about 1.1 to 1.4 times T(max)1, this reduction results in a corresponding reduction in thermal energy that must be invested to heat the HHC residue 94 compared with the case where no FDC1 90 is used to reduce LHC. Second, corresponding to this reduction in material mass is a reduction in material volume, which reduces the hydraulic capacity, or throughput, required of the supplemental reactor section 80. This reduces not only the energy input required, but the size and cost of the capital equipment associated with the supplemental reactor section. Third, regardless of the value of T(max)2, removal by FDC1 90 of LHC in the product mixture 34 avoids subjecting components in the same to higher-severity conditions, which may cause them to undergo further reactions to yield undesirable, lower-molecular-weight products. Finally, by way of corollary with the preceding benefit, removal of LHC from the product mixture 34 provides the possibility to improve selectivity of the upgrading process toward those components that do not initially yield readily to upgrading under lower-severity conditions.

In a particular embodiment, the product mixture 34' exiting the outlet of the supplemental reactor section 80 may flow into a recovery section 38, 52, etc., such as described hereinabove with respect to FIGS. 1-6B and 11. Turning once again to FIG. 12, in another particular embodiment the product mixture flows optionally into a second flash distillation column 96, also designated as FDC2. As with FDC1, FDC2 obtains two fractions from the product mixture flowing thereinto from the supplemental reactor section: a light fraction 98 including water and light hydrocarbons, the latter being designated LHC2; and a heavy fraction 100, designated HHC2. As in the case of FDC1, these two fractions are differentiated from each other on the basis of the boiling point of the light fraction, in this case being designated BP(LHC2), which in one embodiment is below about 280° C., while in yet another particular embodiment BP(LHC2) may be below about 220° C., and in yet another particular embodiment, it may be less than about 160° C. LHC1 and LHC2 may be combined to obtain a single LHC product stream (not shown).

Referring again to FIG. 12, in a particular embodiment a portion of HHC2 100 may be optionally recycled, e.g., at 102, to an upstream point in the supplemental reactor section, e.g. to the premix section 50', where it is combined with HHC1 94. And in yet another embodiment, a portion of the light hydrocarbons from 92 and/or 98, may in particular embodiments be optionally recycled and mixed with HCO feed 22 at points in the primary reactor section 24, 24', 24" before the reaction mixture reaches a temperature of about 60% to 70% of T(max)1, and/or in the premix section 50. Though thought to be desirable to minimize the amount of LHC that is subjected to higher-severity upgrading conditions, the mixing of limited amounts of LHC with HHC1 in the premix section 50 may beneficially permit reduction in the amount of water required to ensure that heavy components in the reaction mixture flowing through the supplemental reactor section 80 are sufficiently disaggregated, the benefit including a corresponding reduction in the energy required to heat the reaction mixture to T(max)2. Though not wishing to be bound by a particular theory of operation, it is believed that components in HHC2 100 may undergo further upgrading if again subjected to the upgrading conditions in the supplemental reactor section 80 by recycling at 102. As in the case of HHC1 94, this approach enables the additional, selective upgrading of heavy components while minimizing or avoiding the subjecting of lighter components 98, removed in FDC2 96, to higher-severity conditions in the supplemental reactor section. This helps to minimize the risk of undesirable decomposition of LHCs that might reduce overall upgrading yield and provides the means to promote further upgrading without increasing the predetermined maximum temperature T(max)2 in the supplemental reactor section.

Figure 13:
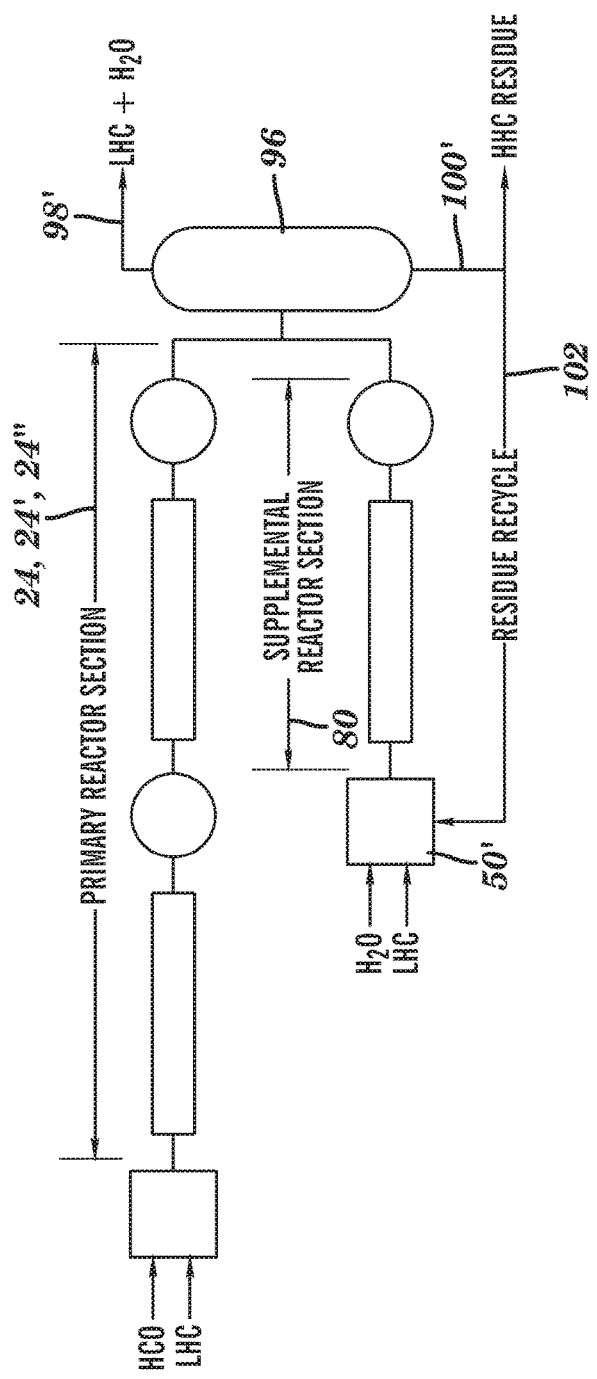
FIG. 13 is a schematic diagram of yet another alternate embodiment of a hydrothermal heavy crude oil (HCO) upgrading system of the present invention.

Referring now to FIG. 13, in another particular embodiment, product mixture outputs from the primary reactor subsection 24, 24', 24" and supplemental reactor subsection 80 feed into a single flash distillation column 96, while a portion of the HHC residue 100' is recycled at 102 to serves as a feed to the supplemental reactor section 80, e.g., via premix 50' as shown. By way of example, suppose that the flash distillation column 96 is operated in such a way that the HHC residue includes components whose boiling points are greater than about 280° C., and that the LHC 98' and HHC residue 100' each represents about 50% of the combined product mixture flowing into the flash distillation column 96. In a particular embodiment the supplemental reactor has the capacity to process up to about 80% of the HHC residue, and therefore would have a throughput of about 40% that of the primary reactor section. Again, the benefit of this processing scheme is that it provides the possibility to optimize the economics of upgrading through the control of multiple process variables, including but not limited to the maximum predetermined temperatures T(max)1 and T(max)2; the operation of the flash distillation column to determine the maximum boiling point of components in the LHC fraction, BP(LHC); and the residue recycle rate (the fraction of the residue that is processed through the supplemental reactor section). Other variables, discussed elsewhere, include flow rate, the amounts of LHC and water or steam in the reaction mixture flowing through the primary reactor section (or subsections); and the size and number of thermal soak chambers, which in combination with flow rate determine the length of time that reaction mixtures in the primary or supplemental reactor sections experience the predetermined maximum temperatures T(max)1 and T(max)2, respectively.

Figure 14:
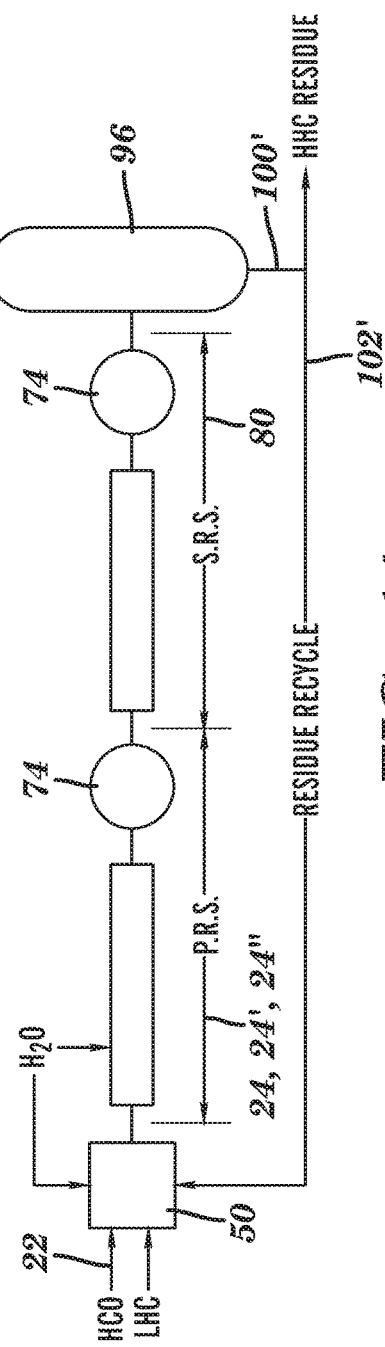
FIG. 14 is a schematic diagram of another embodiment of a hydrothermal heavy crude oil (HCO) upgrading system of the present invention.
Figure 15:
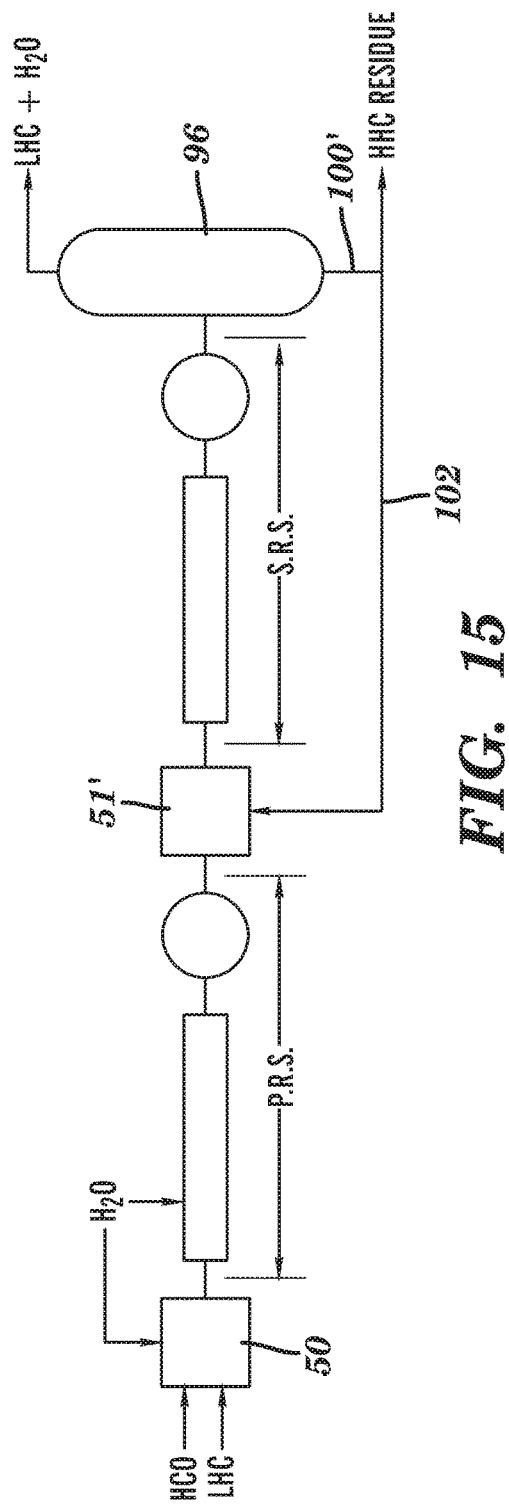
FIG. 15 is a schematic diagram of another embodiment of a hydrothermal heavy crude oil (HCO) upgrading system of the present invention.

Turning now to FIG. 14, the reaction mixture proceeds in a linear sequence from the premix section 50 and then through the primary reactor section 24, 24', 24", the optional supplemental reactor section 80, including optional thermal soak chambers 74. Finally, the product mixture flows into a flash distillation column 96, which, as in the cases of FDC1 and FDC2 described previously, yields LHC 98' and HHC residue 100' products streams whose components are differentiated on the basis of boiling point. In a particular embodiment a portion of the HHC residue 100' from the flash distillation column is recycled at 102' to the premix section 50 disposed upstream from the primary reactor section where it combines with HCO feed 22 and with LHC (e.g., recycled from 98') and/or water. In another particular embodiment depicted in FIG. 15, the residue recycle 102 instead flows into an optional premix section 51' disposed between the primary reactor section 24, 24', 24" and supplemental reactor section 80 where it combines with the reaction mixture flowing from the primary reactor section, and optionally with LHC and/or water supplied to premix section 50. In contrast with embodiments depicted in FIGS. 12 and 13, the capacity of the supplemental reactor section 80 corresponding to the embodiment shown in FIG. 14 is substantially the same as that of the primary reactor section 24, 24', 24", whereas the capacity of the supplemental reactor section used in FIG. 15 would be larger in order to handle the recycled residue 100'.

Figure 16:
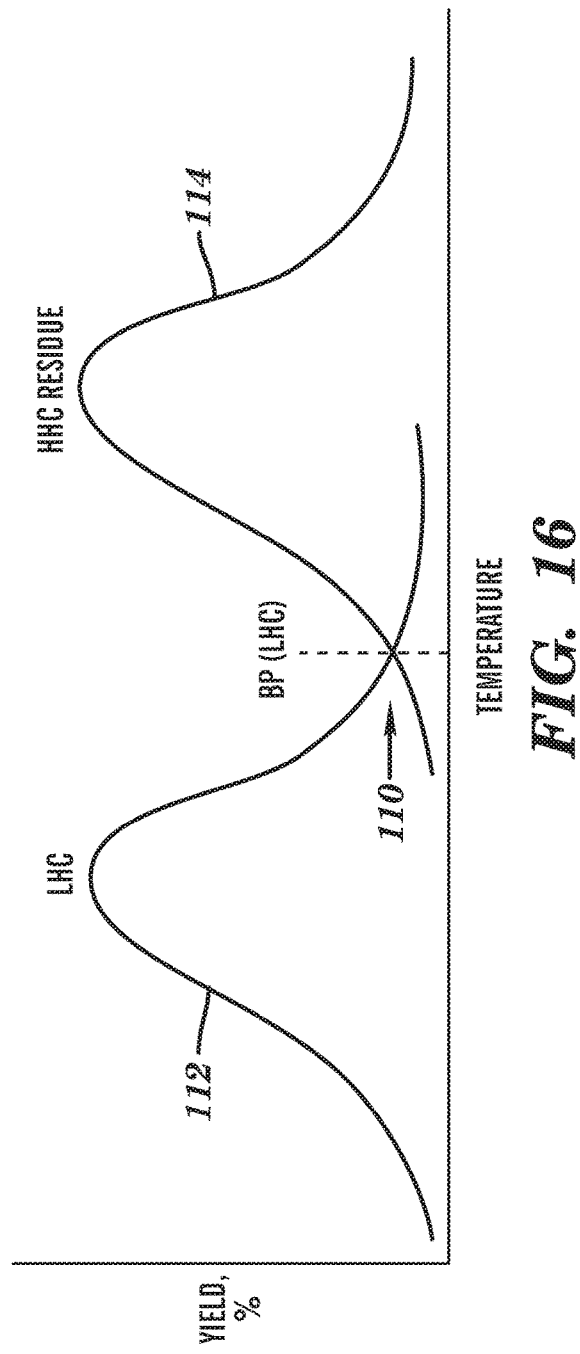
FIG. 16 is a graphical representation of aspects of the embodiments of FIGS. 12-15.

As discussed above, in the embodiments depicted in FIGS. 12-15, flash distillation columns yield two fractions: a light fraction including water and light hydrocarbons (LHCs), and a HHC fraction referred to alternatively as HHC residue or simply as residue, which includes hydrocarbons that are differentiated from the LHCs on the basis of boiling point: LHC components have boiling points below about BP(LHC) while HHC components have boiling points that are higher than about BP(LHC). Though the flash distillation columns serve to separate LHCs from HHC residue on the basis of boiling point, that separation is not absolute. Rather, some compounds with boiling points below BP(LHC) remain in the HHC residue and some with boiling points above BP(LHC) distill with the LHC. In consideration of process optimization objectives, the value of BP(LHC) and the extent of overlap between the two curves (FIG. 16) are determined by (i) the design of the distillation column, including the number of theoretical plates; (ii) the flow rate of the product mixture into the column; (iii) the temperature of the product mixture flowing into the column; and (iv) the operating pressure inside of the column. Referring to FIG. 16, BP(LHC)

effectively represents a temperature range in which compounds contained in both LHC and HHC residue distill, the nominal value of BP(LHC) corresponding to the intersection 110 of the distillation yield curves for LHC and HHC residue, shown at 112 and 114, respectively. The process optimization objectives may consider among other things the yield and quality of LHC desired and the composition of the HHC residue. Not wishing to be bound by a particular theory of operation, the flash distillation columns in the embodiments depicted in FIGS. 12-15 should be controlled so that the quantity of LHC removed is not so great as to either permit the re-aggregation of higher MW compounds in the HHC residue to such an extent that they would resist subsequent upgrading, or cause the viscosity of the HHC residue to become intractably high.

A person possessing common knowledge regarding the design and operation of distillation columns will recognize that flash distillation columns provide a high-throughput, coarse separation between components in a mixture on the basis of their boiling points, in contrast with distillation columns that provide sharper resolution in regard to boiling point by dint of having more theoretical plates. However, the repeated reference in this specification to the use of flash distillation columns is not intended to limit the optional use of higher-resolution columns to serve a process optimization goal such as minimizing the range of the boiling point overlap between heavy and light fractions. Similarly, the portrayal in FIGS. 12-15 of flash distillation columns with only two cutpoints for obtaining light and heavy fractions, e.g. water/LHC and HHC residue, respectively, is not meant to preclude the optional configuration of a distillation column to have three or more cutpoints to obtain from a product mixture two or more LHC fractions in addition to the HHC residue. An additional feature of the process whose importance would be understood by those skilled in the art, and therefore not detailed in the present specification, is the removal from LHC of any relatively high-volatility compounds that might accompany LHC and water in the light fraction obtained by the flash distillation column, which removal may be desirable to make the LHC suitable for purposes described herein.

Figure 17:
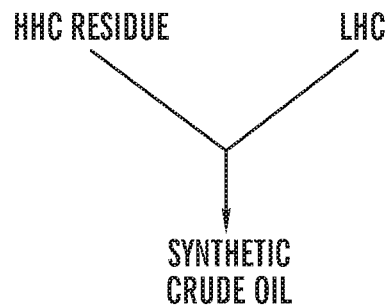
FIG. 17 is a graphical representation of additional aspects of the present invention.

As already has been discussed in some detail with respect to embodiments represented in FIGS. 12 and 13, the embodiments depicted in FIGS. 12-15 afford possibilities to optimize the upgrading process. Referring now to FIG. 17, in a particular embodiment of the present invention all LHC and HHC residue outputs are combined to produce a type of synthetic crude whose ° API, distillation yield, and other properties resemble those of conventional crude and make it pipelineable and suitable as a refinery feedstock. The objective of optimization is to maximize efficiency, a circumscribed view of which, by this embodiment, considers only the quantity and value of process outputs obtained from a given quantity and value of inputs that principally include energy and HCO. In a particular embodiment, the upgrading process is designed and operated at a severity such that substantially all LHC and HHC residue products obtained from HCO feed of a given quality are consumed to produce a synthetic crude oil whose properties meet but do not exceed the minimum values that define pipelineability. Embedded in this definition of efficiency is the concept of yield, which is understood in terms of the amount of high-value, pipelineable material produced relative to HCO and thermal energy input into the process. This efficiency objective may be achieved by a number of means including but not limited to controlling (i) values for the predetermined maximum temperatures T(max)1 and T(max)2 to minimize the net energy applied per-barrel for upgrading and/or (ii) the residue recycle ratio (the fraction of HHC residue exiting the bottom of a flash distillation column that is directed to a point upstream from the flash distillation column where it is combined with the reaction mixture) and/or (iii) the number and size of thermal soak chambers interposed in the flow path.

The constrained view of efficiency just described may be useful to a point, but it is also incomplete. Another particular embodiment takes a holistic view of efficiency that includes all aspects of the constrained view, but also gives consideration to additional negative-value inputs and outputs, examples of which include coke (also referred to as petroleum coke, pet coke, or petcoke when derived from petroleum) and light gases such as methane, ethane, and propane, all of which are generated in significant quantities by the HCO upgrading processes discussed hereinabove. These by-products have value as fuel that may be used to generate thermal energy required to drive the upgrading process. However, greenhouse gas emissions per unit energy produced by petcoke is similar to that for coal. The additional production of pollutants such as $SO_2$ and $NO_X$ further exacerbates the problem. Thus, production of coke both reduces the yield of positive-value upgraded HCO and disproportionately increases the amount of negative-value emissions.

Figure 18:
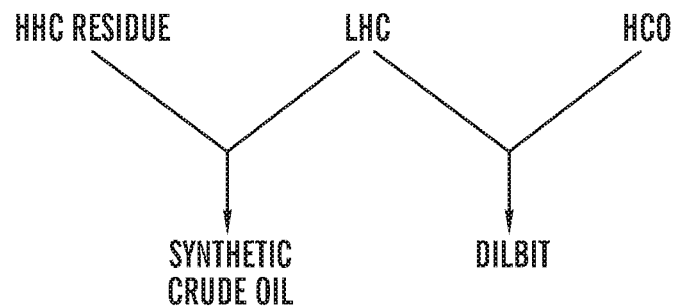
FIG. 18 is a graphical representation of additional aspects of the present invention.
Figure 19:
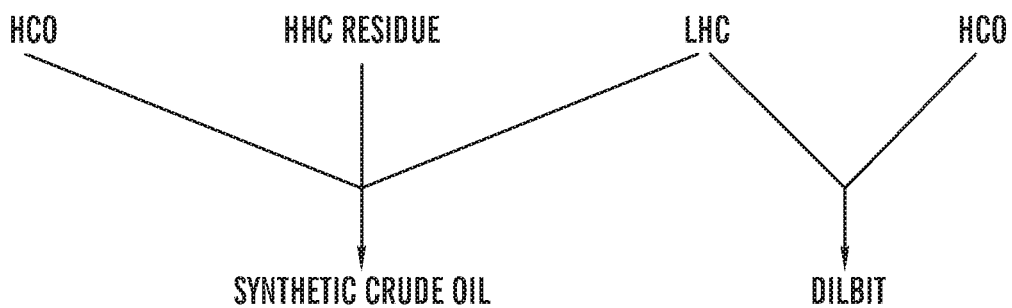
FIG. 19 is a graphical representation of still further aspects of the present invention.

Referring now to FIGS. 18 and 19, in other particular embodiments the unconstrained definition of HCO upgrading efficiency expands to include production of LHC in excess of that required to produce pipelineable synthetic crude oil as described above in relation to FIG. 17. In these particular embodiments of the present invention, processes depicted in FIGS. 12-15 are designed and operated so as produce said excess quantities of LHC by, for example, designing and controlling the upgrading process to operate at higher severity while also minimizing coke formation, the designing and controlling being accomplished through means including but not limited to (i) increasing values for the predetermined maximum temperatures T(max)1 and T(max)2 in the primary and supplemental reactor sections, respectively; and/or (ii) interposing a plurality of thermal soak chambers in the flow path upstream from flash distillation columns; and/or (iii) increasing the size of said chambers to increase the residence time that the reaction mixture experiences upgrading conditions; and/or (iv) increasing the residue recycle ratio. Excess LHC also may be generated by designing and operating flash distillation columns so as to increase the amount of LHC recovered from the reaction mixture while respecting previously discussed cautions against removing too much LHC in flash distillation columns.

Referring again to FIG. 18, excess LHC obtained by such means is, in a particular embodiment, blended with HCO that has not been upgraded to produce diluted bitumen (dilbit), which is another type of upgraded HCO that is pipelineable. This dilbit production can be performed by means of blending operations that are either proximate to or distant from the location of the hydrothermal upgrader, the LHC being transported in the latter case by truck, rail, or pipeline.

Turning again to FIG. 19, all or a portion of the excess LHC may be blended with any combination of (i) HHC residue generated by an upgrading process such as those depicted in FIGS. 12-15, and (ii) HCO that has not been subjected to upgrading. In a particular embodiment, substantially all of the excess LHC is mixed with all HHC residue generated by the upgrading process and with an amount of HCO corresponding to the maximum that can be combined with the other blending components to produce synthetic crude oil that meets the requirements for pipelineability. In yet another embodiment, excess LHC not consumed in the production of synthetic crude oil may be used for dilbit production, whether in proximity to or at a location remote from the point of LHC production.

The invention described heretofore with reference to specific exemplary embodiments for the purposes of illustration and description is not intended to be exhaustive or to limit the invention to the precise form disclosed. Many modifications and variations are possible in light of this disclosure. For example embodiments of the present invention corresponding to depictions in FIGS. 12-15 may be provided with a recovery section wherein some portion of the thermal energy invested into the process may be captured from the product mixture stream or from the LHC/water and HHC residue product streams and used to facilitate the heating of the reaction mixture upstream from the flash distillation column, such as shown and described hereinabove with respect to FIGS. 1-6B and 11. Similarly, the embodiments of FIGS. 12-15 may supply water, e.g., which is separated from LHC after removal from the flash distillation column, to the HHC residue product stream 94, 100, to remove undesirable water-soluble materials therefrom, which may include compounds of vanadium and nickel. Also, it should be recognized that water removed from the LHC downstream of the flash distillation column(s) may be recovered and fed back to the HCO or the reaction mixture at an upstream point in the flowpath of the reaction mixture, such as shown and described with respect to FIGS. 2-6B. Moreover, it should be understood that a controller 32 (FIG. 1) may be used to control operation, including optimizing the blending of HHC residue and LHC, or of HHC residue, LHC, and HCO, or of LHC and HCO to produce synthetic crude oil or dilbit that meets the minimum requirements of pipelineability as described herein. It is intended that the scope of the invention be limited not by this detailed description, but rather by the claims appended hereto.

The understanding of process efficiency now has been expanded to encompass upgraded HCO obtained by means of embodiments depicted in FIGS. 12-15, through the simple dilution with excess LHC as depicted in FIGS. 18 and 19, and by blending with HHC residue and excess LHC according to FIG. 19. Consider now that the SAGD (Steam Assisted Gravity Drainage) oil recovery process used widely in Alberta is known to be energy intensive, owing primarily to the generation and downhole injection into oil sands deposits of large quantities of high pressure steam to produce water-bitumen emulsions that are recovered by pumping to the surface where water is separated to yield HCO. Extraction by the SAGD process of bitumen in oil sand deposits involves complex thermodynamic, physical chemistry, and mass transfer phenomena which others have shown can be advantageously altered by addition into the steam of hydrocarbon, the core principle being simply that the bitumen in the oil sands does not mix efficiently with water but does with added hydrocarbons. The enhancement is the increasing of the yield of recovered HCO per unit energy invested, one measure being the cumulative steam-to-oil ratio (CSOR), which is the amount of steam as liquid water that must be generated and injected downhole to produce a barrel of HCO. Currently in the range of 2:1 to 3:1, a solvent-enhanced SAGD (SAGD/SE) process has the potential to reduce the CSOR by 25% to 50%, resulting in a corresponding reduction in energy consumption and greenhouse gas emissions associated steam generation.

Generally, hydrocarbons employed to recover HCO by means of SAGD/SE are "imported" to the wellhead. That is, they are not generated at the wellhead, but instead must be purchased in the marketplace and transported to the wellhead. Because cost is an issue, and lower molecular-weight hydrocarbons such as propane or butane generally are cheaper than equivalent quantities of pentanes, gasoline, or distillates, economics of SAGD/SE dictate use of the former. A stated advantage of doing so is that HCO produced by SAGD/SE has ° API values that typically are in the range of 13-17, compared with values that are typically below 10 for the conventional SAGD process. However appealing those numbers may be, they belie the reality that conventional SAGD/SE is selective against heavier hydrocarbons that also have value. In effect, SAGD/SE that uses light, three- and four-carbon solvents actually may have a lower yield than conventional SAGD, yield being defined in terms of the amount of HCO removed from oil sand deposits relative to the total available HCO that is resident in those deposits. Though not wishing to be bound by a particular theory concerning mechanisms by which SAGD/SE operates, the higher ° API values for the HCO obtained by it are consistent with the fact that compounds in crude oils whose polarity, MW, and aromaticity are high, e.g. asphaltenes, have relatively low solubility in low-MW alkanes such as n-pentane, much less propane and butanes, compared with hydrocarbons that have both higher MW and diverse chemical functionality. Accordingly, SAGD/SE employing low-MW alkanes may be selective against compounds that otherwise have fuel value and may readily form emulsions with water to enable their recovery. Of course, the relatively lower level of heavy components in the HCO recovered by SAGD/SE is an advantage when no convenient, economical means exists to upgrade those components, such as that afforded by the present invention. Thus, the purported advantage of conventional SAGD/SE comes at the expense of reduced overall recovery from oil sands deposits of hydrocarbons contained therein.

In a particular embodiment of the present invention, excess LHC produced as described hereinabove is injected with steam into oil sand deposits. Though not wishing to be bound by a particular theory of operation, such an LHC-enhanced SAGD process (SAGD/LHC) is thought to have an important advantage over SAGD/SE that relies on propane, butanes, or pentanes. The chemical composition LHC is thought to include compounds whose molecular weights and molecular weight ranges are higher, and which have diverse chemical structures including but not limited hydrocarbons containing various straight-chain, branched, and aromatic moieties. As such, it is thought that SAGD/LHC will afford higher yields than SAGD/SE that relies on aliphatic hydrocarbons with just 3-4 or even 5 carbons. Of some concern is the possibility for fugitive emissions of light hydrocarbons such as propane from oil sand deposits where SAGD/SE is being applied, such emissions being considered greenhouse gases. By contrast, such emissions from SAGD/LHC process are expected to be substantially lower due to the lower vapor pressure of LHCs.

Also, the recovery of low MW solvents used for SAGD/SE, which are contained in the water-HCO mixture extracted from oil sand deposits, is an economic necessity, as doing so reduces the amount of solvent that must be purchased and transported to the wellhead. Additionally, pipelineability specifications relating to vapor pressure effectively limit the quantities of propane and butanes that may be contained in crude oils. Yet, the recovery and reuse of such solvents relies on equipment for their handling, purification, and storage, representing an additional capital burden. By contrast, LHC used in SAGD/LHC and recovered with HCO is compatible with pipelineable crude oil and therefore does not need to be removed, e.g. when dilbit is produced from HCO. Equally important, LHC used in SAGD/LHC does not need to be purchased on the open market and transported to the wellhead, but instead can be produced by means of the instant invention when installed and operating in relatively close proximity to the wellhead.

In yet another particular embodiment, excess LHC generated by means of the instant invention may be transported by truck, rail, or pipeline to a site where SAGD/SE is being used to extract HCO from oil sand deposits, the purpose being to supplement the low-MW hydrocarbons conventionally used in SAGD/SE, or to replace the same in the event that supplies thereof are limited, or if market value of the same, relative to that of LHC, fluctuates in a manner that warrants such a hybridized strategy. Thus, this particular embodiment serves to mitigate market-based risks associated with a one-dimensional SAGD/SE approach.

Alternate Embodiment

Exemplary embodiments described hereinabove may be applied to effect improvement in the quality of HCO, where quality may be thought of as the aggregate of a plurality of properties. Notwithstanding the fact that configuration of hydrothermal upgrading systems in accordance with these embodiments supports a variety of processing and economic objectives, they do not in general selectively achieve the improvement of one property independent of another. Indeed, improvements in specific properties may be correlated and even have a common basis in chemical transformations promoted through hydrothermal processing. For example, reductions in both viscosity and density, and also the change of distillation yield profile is generally understood to result consequentially from the overall lower molecular weights of constituent compounds in upgraded HCO compared with unprocessed HCO. Thus, they can be thought of as being different manifestations of an underlying chemical property such as molecular weight. However, that may not be strictly the case for improvements in other property values. In a second scenario, property values decrease but are not manifestations of molecular weight. For example, hydrothermal upgrading may also reduce significantly the amounts of sulfur or metals such as nickel and vanadium. Wishing to not be bound by any particular theory of operation, these reductions may be thought of as resulting from chemical mechanisms related to those causing molecular weight reductions but themselves concern chemical properties distinct from molecular weight.

In a third scenario, changes in the value of a property may be generally unrelated to molecular weight or the mechanisms responsible for reduction in molecular weight. An example is total acid number (TAN), whose values in HCO also decrease upon hydrothermal upgrading. TAN is generally thought to be due to carboxylic acid functional groups (also called carboxyl groups, symbolized as —COOH) attached to molecules comprising crude oil. These groups have low mass and are not regarded generally as dominating structures in crude oil that are responsible for molecular weight. Not wishing to be bound by a particular theory of operation, the reduction in TAN would seem therefore to be due to reaction mechanisms distinct from those responsible for reducing the overall size of molecules in HCO. Specifically, TAN reduction would be consistent with either decarboxylation or decarbonylation, both of which result in loss of a carboxyl group from the molecule to which it is attached. Decarboxylation does so by releasing carbon dioxide according to the equation, $RCOOH \rightarrow RH+CO_2$, whereas the corresponding decarbonylation reaction yields a 1-alkene, carbon monoxide, and water according to the equation, $R'CH_2CH_2COOH \rightarrow R'CH=CH_2+CO+H_2O$, where the "R-groups" R and R' refer generally to any group of atoms. Both reactions result in elimination of oxygen from the carboxylic acid and therefore may be referred to generally as deoxygenation reactions.

Restated, deoxygenation occurs under the same conditions as, but is thought to be independent of, reactions responsible for improvement in other HCO properties. Consider now a mixture of carboxyl-containing organic compounds that is not HCO or other petroleum. Under hydrothermal conditions described in exemplary embodiments, the possibility exists that compounds in that mixture would undergo deoxygenation even if they were not predisposed to undergo reactions of the type that are responsible for improvement in other HCO properties.

Alternative embodiments of the present invention apply hydrothermal upgrading not to a petroleum feedstock, but to fat, oil, or grease from vegetable or animal sources for the purpose of producing renewable platform chemicals, solvents, or fuels. In a specific example of the latter, the term "biodiesel" applies to fatty acid methyl esters (FAMEs, which may be symbolized as $RCOOCH_3$) obtained by transesterification of triacylglycerols (TAGs, which also are triglycerides) from natural feedstocks. FAMEs have the benefit of being easy to produce via a reaction that is simple, uncomplicated, and highly selective and controlled with respect to the chemical transformation of TAGs. The process is correspondingly simple and requires low capital investment. However, FAMEs have properties that in some cases make them inferior to petroleum-derived diesel blending components. With the methyl ester group (—$COOCH_3$) being implicated, an approach is therefore desirable which is capable of producing oxygen-free hydrocarbons from FAMEs, TAGs, or free fatty acids (FFAs, which may be symbolized generally as R'COOH) obtained by saponification of glycerolipids. Because such deoxygenated products more closely resemble hydrocarbons obtained from petroleum sources, the term "renewable diesel" is sometimes applied to differentiate them from biodiesel.

The terms "fatty acid resource" as used hereinafter shall be understood to be any source of fatty acid including one or more materials selected from a group consisting of FFAs, their precursors, and their derivatives, including but not limited to FAMEs, TAGs, di- and mono-glycerides, lipids, salts of fatty acids, vegetable oils, animal fats, and mixtures thereof. These alternative embodiments are not limited in terms of the origin of a fatty acid resource, although renewable vegetable and animal sources are particularly relevant in terms of economic and enviro-social considerations, where vegetable oil is by way of non-limiting example one or more materials selected from the group consisting of corn oil, cottonseed oil, canola oil, rapeseed oil, olive oil, palm oil, peanut oil, ground nut oil, safflower oil, sesame oil, soybean oil, sunflower oil, algae oil, almond oil, apricot oil, argan oil, avocado oil, ben oil, cashew oil, castor oil, grape seed oil, hazelnut oil, hemp seed oil, linseed oil, mustard oil, neem oil, palm kernel oil, pumpkin seed oil, tall oil, rice bran oil, walnut oil, and the like, including mixtures and derivatives thereof; and animal fat is by way of non-limiting example one or more materials selected from the group consisting of blubber, cod liver oil, ghee, lard, tallow, yellow grease, used cooking oil, and the like, including mixtures and derivatives thereof. Those skilled in the art will understand that TAGs are triglycerides, which are included with diglycerides and monoglycerides in a class of lipids referred to as glycerolipids. Accordingly, the term "glycerolipid" shall hereinafter mean one or more materials selected from a group consisting of monoglycerides, diglycerides, triglycerides, and mixtures thereof whereas TAG shall mean triacylglycerol.

In these alternative embodiments, a fatty acid resource is subjected to hydrothermal upgrading by exemplary embodiments of the present invention as described hereinabove for HCO, modified as appropriate to accommodate and ultimately separate and capture carbon monoxide or carbon dioxide from water and the other reaction products. In accordance with those embodiments, the composition of the reaction mixture and the severity of process conditions, in particular the temperature and the residence time, may be varied to optimize the product quality in terms of the extent of deoxygenation.

Just as for HCO, hydrothermal upgrading of a fatty acid resource may foster a variety of reactions that occur substantially independently of each other. But in contrast with HCO, a fatty acid resource is not a high-molecular-weight hydrocarbon, but may appropriately be classified as a light hydrocarbon, given that fatty acids, whether they exist as FFAs or as acyl moieties in FAMEs, glycerolipids, and the like have molecular weights less than about 300-350 g/mole, which nominally corresponds to compounds in diesel. Therefore, in contrast with heavy hydrocarbons including HCO, a fatty acid resource is "light."

In a particular example of the alternative embodiments, the objective is to primarily promote decarboxylation while minimizing other reactions that may result in further reduction in molecular weights of deoxygenation products. Not wishing to be bound by any particular theory of operation, achieving that objective may require reduced process severity compared with that applied in HCO upgrading. Given that deoxygenation reaction may not occur at appreciable rates at temperatures below about 275° C. to 300° C., reduction in severity may depend instead on reducing residence times below those appropriate for HCO. Accordingly, applicable residence times for hydrothermal upgrading of a fatty acid resource range from about 15 seconds to about 15 minutes while T(max) temperatures in the reactor section or in a supplemental reactor may have maximum values between about 275° C. and about 425° C.

In another particular embodiment, process severity is increased to optimize product quality in terms of product composition determined by reactions in addition to those related to deoxygenation. Not wishing to be bound by any particular theory of operation, higher temperature and longer residence times may be used to promote such other reactions that yield product mixtures containing compounds whose molecular weights are lower than would be obtained under lower-severity conditions where deoxygenation predominates.

In another particular embodiment, the reaction mixture may be modified through the addition of co-solvents that enhance (i) the distribution of the fatty acid resource (the hydrocarbon phase) within the water phase, (ii) the distribution of the water phase within the hydrocarbon phase, (iii) the formation of an emulsion comprising the water and hydrocarbon phases, or (iv) the diffusivity of water into the phase-separated hydrocarbon phase of the reaction mixture. And in yet another particular embodiment, reagents or catalysts may be added to the reaction mixture to promote deoxygenation and/or other reactions for the purpose of optimizing product yield and/or desired quality parameters, and/or optimizing the efficiency of the hydrothermal upgrading process in terms of resources like water and energy used.

In some art that has been developed to promote deoxygenation of a fatty acid resource, purification of those feedstocks may be necessary to remove water or other contaminants. Also, TAGs are preferred feedstocks in some art while FFAs or salts of the FFAs are preferred feedstocks in others. A particularly beneficial aspect of some of the present alternative embodiments is that a "crude" fatty acid resource that has not been purified or otherwise modified may be introduced into the premix section or the reactor section for upgrading by deoxygenation. Moreover, in particular ones of the alternative embodiments, FAMEs, glycerolipids, and the like may be preprocessed to liberate FFAs prior to introduction into the premix section or the reactor section, where the preprocessing may be performed by means of a system and method that is separate from or integrated with embodiments of the present invention.

Not wishing to be bound by any particular theory of operation, it is suspected that the liberating of FFAs from the fatty acid resource prior to its introduction into the reactor section helps to disperse water in the fatty acid resource or vice versa, even causing an emulsion to form, where the dispersing is beneficial for promote upgrading reactions facilitated by water. It will be understood by those skilled in the art that in the aforementioned dispersing is most readily accomplished by the salt of FFAs, which for example may be produced by titration of the carboxylic acid COOH group by sodium hydroxide to form the corresponding carboxylate salt, which is soap, according to the equation R"COOH+NaOH→R"COONa+$H_2O$, where R" is the hydrocarbon chain of the fatty acid. In the event that the fatty acid resource in its as-supplied condition contains some FFA, then the preprocessing may be a simple matter of adding NaOH to the fatty acid resource, before or in the premix or reactor sections, in an amount sufficient to generate an optimum concentration of soap. Those skilled in the art will also recognize that even if the fatty acid resource is a glycerolipid, the addition of NaOH to the fatty acid resource in the premix or reactor sections results in saponification (hydrolysis) that readily yields the soap, R"COONa.

Chemical equations given hereinabove depict how carboxylic acids may undergo deoxygenation via decarboxylation or decarbonylation. Those skilled in the art will understand that only decarbonylation is available to glycerolipids unless first saponified to obtain FFAs or salts thereof plus glycerol. However, though not wishing to be bound by a particular theory of operation, embodiments of the present invention effect in situ saponification of a glycerolipid resource apart from the addition of NaOH, the rates for which saponification are expected to be very high due to at least two reasons. First, the ion product for liquid water, defined as $K_w=[H^+][OH^-]$, is significantly higher ($pK_w$ is lower) at elevated temperatures than it is at room temperature. By way of a non-limiting example, at 25° C. and 300° C., the $pK_w$ for water is 14.0 and 11.4, respectively, meaning that the concentration of both hydroxide ion, $OH^-$, and hydrogen ion, $H^+$, is about 20 times higher at the higher temperature. Second, given that the value for the rate constant for ester hydrolysis at some temperature T, $k_T$, is known to have a temperature dependency that follows some form of the Arrhenius equation, the rate constant will have a value at 573 K (300° C.), $k_{573}$, that is expected to be orders of magnitude greater than the value $k_{573}$ at 298 K (25° C.).

Those skilled in the art appreciate that both the hydrogen and hydroxide ions are implicated in catalysis of ester hydrolysis, and that the rate of that reaction increases as a direct function of their concentrations, and also that the equation describing the rate of ester hydrolysis may include a term that contains concentrations of both ions, for example $k_T \cdot [H^+] \cdot [OH^-]$. In that case, the rate of hydrolysis at 573 K, $R_{573}$, relative to the rate of hydrolysis at 298 K, $R_{298}$, might be represented by the following equation:

$$\frac{R_{573}}{R_{298}} = \frac{k_{573}}{k_{298}} \cdot 400$$

If the value for ratio between the two rate constants given in the preceding equation is only 100, then $R_{573}/R_{298}=40,000$. However, the expectation is that $k_{573}/k_{298} \gg 100$. Given these facts, glycerolipids flowing through the reactor section are expected to be quantitatively hydrolyzed to yield their corresponding FFAs and glycerol at relatively low temperatures compared with those at which the rates of deoxygenation reactions become significant. Additionally, formation of FFAs in this fashion is autocatalytic insofar the FFAs are by definition acids capable of undergoing dissociation to form carboxylate anions, $RCOO^-$, and hydrogen ion, $H^+$, the latter serving to increase the reaction rate in proportion to the increase in hydrogen ion concentration, $[H^+]$, through its contribution to the aforementioned rate term, $k_T \cdot [H^+] \cdot [OH^-]$. Stated simply, the more FFA that is formed in the reactor section, the faster the rate of FFA formation.

Those skilled in the art will recognize, in light of the instant disclosure, that embodiments described hereinabove may be used to upgrade pyrolysis oil produced by processing biomass at elevated temperatures under a variety of conditions and referred to variously as biomass pyrolysis oil, bio-oil, or simply pyoil. Because biomass contains a preponderance of cellulosic material, pyoil characteristically has high oxygen content which, by way of non-limiting example, may exist in the form of aldehyde, ketone, ester, lactone, hydroxyl, and carboxylic acid functionalities. Pyoil may also comprise fractions that may generally be characterized as light and heavy. Not wishing to be bound by any particular definition of light and heavy, the two may be delineated in terms of molecular weight where the light/heavy boundary is between about 200 g/mole and about 300 g/mole. In another particular embodiment of the present invention, materials selected from a group consisting of pyoil, light pyoil, and heavy pyoil are subjected to hydrothermal upgrading to promote deoxygenation via reactions including but not limited to decarboxylation and decarbonylation, obtaining thereby products that may serve as resources for platform chemicals, fuels, and solvents.

In another embodiment, a fatty acid resource containing FFAs is combined with HCO in the premix section for the purpose of enhancing disaggregation reactions that predispose HCO to upgrading reactions. In a particular embodiment, caustic soda (NaOH) or potassium hydroxide (KOH) are added to fatty acid resources in amounts sufficient to quantitatively saponify glycerolipids prior to combining with HCO in the premix section, the equivalents amounts of FFA ranging from about 0.4% to 4% by weight of the HCO. Soap generated thereby serves the purpose of facilitating the disaggregation of asphaltenic and other structures in HCO, and the dispersion of water into HCO alone or in combination with LHC. The carboxylic acid groups associated with HCO undergo deoxygenation as do the carboxylate groups on the fatty acid salts, the latter yielding distillate-quality hydrocarbons corresponding to petroleum-derived diesel, the net result being upgraded HCO with TAN values below tariff limits that trigger price discounting.

In yet another embodiment, the salts of FFAs from fatty acid resources are combined into steam that is injected into deposits of bituminous sand to enhance the efficiency of bitumen recovery by the SAGD process by promoting the mobility of the water and/or the bitumen, whether alone or in combination with LHC.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:
1. A system for upgrading a continuously flowing process stream including hydrocarbons, comprising:
   a fluid flow path configured to convey the process stream continuously therethrough in a downstream direction, the flow path including a reactor;
   the reactor configured to receive the process stream in combination with water, at an inlet temperature within a range of about 60° C. to about 200° C.;
   the reactor including one or more process flow tubes defining an aggregated interior cross-sectional dimension in a plane extending transversely to the downstream direction therethrough, the one or more flow tubes having a combined length of at least about 4 times the aggregated interior cross-sectional dimension;
   the reactor configured to apply heat to the process stream flowing therethrough, to progressively heat the process stream from the inlet temperature at an upstream portion of the reactor, to an outlet temperature T(max)1 within a range of between about 260° C. to about 425° C. at a downstream portion of the reactor;
   the reactor configured to maintain the process stream at a pressure sufficient to ensure that the process stream remains a single phase at T(max)1;
   a controller configured to selectively adjust a rate of flow of the process stream through the reactor to maintain a total residence time of the process stream in the reactor of greater than about 0.25 minutes and less than about 25 minutes;
   wherein said rate of flow, said flow tube lengths, and said application of heat, are configured to minimize or prevent coke formation; and
   a recovery unit disposed downstream of the reactor in the fluid flow path, the recovery unit including one or more separators configured to separate water, light hydrocarbons (LHC) and any other volatile components having boiling points at atmospheric pressure below a predetermined maximum value of BP(LHC1), wherein the recovery unit is configured to recover thermal energy and water from the process stream, to reduce the temperature of the process stream flowing through the recovery unit to said inlet temperature, and to reduce vapor pressure of the process stream flowing through the recovery unit.

2. The system of claim 1, wherein the recovery unit is configured to separate components having a BP(LHC1) below about 280° C.

3. The system of claim 2, wherein the recovery unit is configured to separate components having a BP(LHC1) below about below about 220° C.

4. The system of claim 3, wherein the recovery unit is configured to separate components having a BP(LHC1) below about 160° C.

5. The system of claim 1, wherein the recovery unit comprises a flash distillation column.

6. The system of claim 1, wherein the one or more separators comprises a flash drum.

7. The system of claim 6, wherein the recovery unit is configured to control recovery of thermal energy from the process stream to selectively adjust the temperature of the process stream flowing into the flash drum to facilitate recovery of LHC.

8. The system of claim 1, wherein the one or more separators comprises a fractionation column for separating LHC into two or more fractions to produce recovered LHC product streams differentiated on the basis of boiling point range of their components.

9. The system of claim 1, configured to add one or more materials to the process stream upstream of the recovery unit, to form a substantially uniform dispersion.

10. The system of claim 9, configured to add the one or more materials to the process at one or more points upstream of a point at which the process stream reaches a temperature within a range of about 80% to about 90% of T(max)1.

11. The system of claim 9, configured to add the one or more materials to the reactor.

12. The system of claim 9, comprising a premixer disposed in the fluid flow path upstream of the reactor, the premixer configured to maintain and supply the process stream to the reactor at said inlet temperature, and further configured to add the one or more materials to the process stream.

13. The system of claim 9, wherein the one or more materials is selected from a group consisting of water, steam, hydrocarbons, and combinations thereof.

14. The system of claim 9, wherein the one or more materials comprises water.

15. The system of claim 14, wherein water is supplied to the process stream to provide a ratio of HCO to water (HCO:water) within a range of from about 1:1 to 20:1.

16. The system of claim 9, wherein the one or more materials comprises hydrocarbons.

17. The system of claim 16, wherein the ratio between HCO that has not been upgraded and hydrocarbons added to the process stream (HCO:added hydrocarbons) is within a range of from about 1:2 to 20:1.

18. The system of claim 16, further configured to add hydrocarbons to the process stream at a location upstream of a location at which water is added to the process stream.

19. The system of claim 18, being configured to add hydrocarbons to the process stream upstream of a point at which the process stream is within a range of about 60% to about 70% of T(max)1.

20. The system of claim 16, wherein the hydrocarbons comprise one or more of recovered LHC, propane, butanes, pentanes, hexanes, heptanes, octanes, nonanes, decanes, toluene, xylenes, aromatic solvents, and combinations thereof.

21. The system of claim 16, wherein the recovery unit is configured to recover LHC from the process fluid for recycling to the process stream upstream of the recovery unit.

22. The system of claim 21, wherein the controller is configured to selectively adjust a rate of heating of the process stream within the reactor.

23. The system of claim 22, wherein the controller is configured to selectively adjust variables including (i) values for T(max)1 and T(max)2 and/or (ii) a recycle ratio including the percentage of the process stream exiting the recovery unit that is recycled to the process stream upstream of the recovery unit; and/or (iii) the total residence time of the process stream in the reactor.

24. The system of claim 9, wherein the one or more materials comprises salts of fatty acids from a fatty acid resource.

25. The system of claim 24, wherein the fatty acid resource comprises glycerolipids or lipids selected from a group including animal fats vegetable oils, spent cooking oil, biosolids, or biooil.

26. The system of claim 1, wherein the one or more process flow tubes each has an interior cross-sectional dimension in the form of an interior diameter, and the aggregated interior cross-section dimension comprises a sum of interior diameters of any process flow tubes configured to convey the process stream in parallel with one another.

27. The system of claim 1, wherein the outlet temperature T(max)1 is within a range of between about 260° C. to about 325° C.

28. The system of claim 1, wherein the reactor is configured to maintain the process stream at a pressure sufficient to substantially prevent formation of a gas phase separate from a liquid phase of the process stream therein.

29. The system of claim 28, wherein the reactor is configured to maintain the process stream at a pressure within a range of about 1500 to about 3000 psia.

30. The system of claim 29, wherein the reactor is configured to maintain the process stream at a pressure within a range of about 1500 to 2000 psia.

31. The system of claim 29, wherein the reactor is configured to maintain the process stream at a pressure within a range of about 2000 to 3000 psia.

32. The system of claim 1, wherein the controller is configured to selectively adjust a rate of heating of the process stream within the reactor.

33. The system of claim 1, comprising a premixer disposed in the fluid flow path upstream of the reactor, the premixer configured to maintain and supply the process stream to the reactor at said inlet temperature.

34. The system of claim 33, wherein the premixer is configured to maintain the process stream at a pressure sufficient to substantially prevent formation of a gas phase separate from a liquid phase of the process stream therein.

35. The system of claim 33, wherein the premixer is configured to add one or more materials to the process stream to form a substantially uniform dispersion.

36. The system of claim 1, wherein the reactor is divided into a series of reactor sub-portions spaced along the flow path.

37. The system of claim 1, wherein the reactor is divided into a series of reactor sub-portions spaced along the flow path, and HCO in the process stream disaggregates to form a substantially uniform dispersion at a temperature in a range of about 80% to 90% of T(max)1 and one or more primary reactor sub-portions are configured to heat the process stream to a predetermined maximum temperature of T(max)1, and one or more supplemental reactor sub-portions are configured to heat the process stream to a second predetermined maximum temperature (T(max)2).

38. The system of claim 37, wherein the primary and supplemental reactor sub-portions feed the process stream in parallel into the recovery unit.

39. The system of claim 37, wherein the supplemental reactor sub-portion is downstream of the primary reactor sub-portion.

40. The system of claim 37, wherein the recovery unit is downstream of the supplemental reactor sub-portion.

41. The system of claim 40, wherein a portion of the HHC product stream from the recovery unit is recycled back to the process stream upstream of the supplemental reactor sub-portion.

42. The system of claim 41, wherein the portion of the HHC product stream is fed via a premixer disposed upstream of the supplemental reactor sub-portion.

43. The system of claim 42, wherein the portion of the HHC product stream is fed to a premixer disposed upstream of the primary reactor sub-portion.

44. The system of claim 41, comprising another recovery unit disposed between the primary reactor sub-portion and the supplemental reactor sub-portion.

45. The system of claim 44, wherein a portion of the HHC product stream from the other recovery unit is recycled back to the process stream upstream of the supplemental reactor sub-portion.

46. The system of claim 37, wherein the second predetermined maximum temperature T(max)2 is within a range of about 1.0 to 1.1 times T(max)1.

47. The system of claim 37, wherein the second predetermined maximum temperature T(max)2 is within a range of about 1.1 to 1.4 times T(max)1.

48. The system of claim 37, comprising one or more unheated flow-through chambers disposed within the reactor flow path at the outlet from one or more reactor sub-portions, said one or more flow-through chambers being insulated, sized and shaped to facilitate kinetics associated with disaggregation and/or upgrading of HCO in the process stream flowing thereinto by lengthening residence time spent by the process stream at about the temperature at said outlet or outlets.

49. The system of claim 48, wherein the one or more flow-through chambers are configured to be heated so that the temperature of the process stream flowing from the outlet of each chamber is about the same as at the inlet thereto.

50. The system of claim 1, wherein the one or more flow tubes has a combined length of at least about 30 times the aggregated interior cross-sectional dimension.

51. The system of claim 1, wherein the process stream comprises a renewable bio-feedstock, and the controller is configured to selectively adjust the rate of flow of the process stream through the reactor to maintain a total residence time of the process stream in the reactor of greater than about 0.25 minutes and less than about 15 minutes.

52. The system of claim 51, wherein the renewable bio-feedstock is bio-mass pyrolysis oil or a fatty acid resource.

53. The system of claim 52, wherein the fatty acid resource comprises glycerolipids from vegetable and animal sources, cooking oil, biosolids, or biooil.

54. A method for upgrading a continuously flowing process stream including heavy crude oil (HCO), the method comprising supplying the process stream to the system of claim 1.

55. The method of claim 54, comprising mixing at least a portion of the recovered LHC with the HHC product stream to form synthetic crude oil.

56. The method of claim 55, further comprising mixing at least a portion of the recovered LHC and the HHC product stream with HCO that has not been upgraded to form synthetic crude oil.

57. The method of claim 54, comprising mixing at least a portion of the recovered LHC with HCO that has not been upgraded to form dilbit.

58. The method of claim 54, comprising injecting at least a portion of the recovered LHC with steam into oil sand deposits to facilitate the recovery of HCO from said deposits through an LHC-enhanced steam assisted gravity drainage (SAGD) process.

59. The method of claim 58, wherein the recovered LHC injected with steam in an LHC-enhanced SAGD process is combined with one or more hydrocarbons selected from a group consisting of ethane, propane, butanes, pentanes, hexanes, and heptanes, and combinations thereof.

60. The method of claim 59, wherein the ratio between said hydrocarbons and recovered LHC is within a range of from about 1:50 to 50:1.

* * * * *